United States Patent
Fountain et al.

(10) Patent No.: US 9,357,791 B2
(45) Date of Patent: Jun. 7, 2016

(54) COFFEE PRODUCTS AND RELATED PROCESSES

(75) Inventors: Gerald Olean Fountain, Wilmette, IL (US); Alan Gundle, Wappenham (GB); Won Cheal Kang, Headington (GB)

(73) Assignee: Kraft Foods R & D, Inc., Deerfield, IL (US)

( * ) Notice: Subject to any disclaimer, the term of this patent is extended or adjusted under 35 U.S.C. 154(b) by 0 days.

(21) Appl. No.: 13/810,612

(22) PCT Filed: Jul. 15, 2011

(86) PCT No.: PCT/US2011/044127
§ 371 (c)(1),
(2), (4) Date: Apr. 22, 2013

(87) PCT Pub. No.: WO2012/009605
PCT Pub. Date: Jan. 19, 2012

(65) Prior Publication Data
US 2013/0202748 A1    Aug. 8, 2013

(30) Foreign Application Priority Data
Jul. 16, 2010    (GB) .................................. 1012034.3

(51) Int. Cl.
*B65D 81/32*    (2006.01)
*A23F 5/28*    (2006.01)
(Continued)

(52) U.S. Cl.
CPC ... *A23F 5/28* (2013.01); *A23F 5/08* (2013.01); *A23F 5/30* (2013.01); *A23F 5/34* (2013.01);
(Continued)

(58) Field of Classification Search
CPC .................................. A23F 5/08; A47J 31/44

USPC .......................... 426/115, 116, 595, 385, 471
See application file for complete search history.

(56) References Cited

U.S. PATENT DOCUMENTS 1,766,447 A    6/1930    Moir
1,933,158 A    10/1933    Bohn et al.
(Continued)

FOREIGN PATENT DOCUMENTS

CN    1761400 A    4/2006
CN    101267743 A    9/2008
(Continued)

OTHER PUBLICATIONS

Extended European search report by European Patent Office dated Sep. 17, 2013 for Application No. 13178964.6 (5 pgs.).
(Continued)

*Primary Examiner* — Preston Smith
(74) *Attorney, Agent, or Firm* — Fitch, Even, Tabin & Flannery LLP

(57) ABSTRACT

A coffee milling process comprising the steps of: a) introducing particles of a roasted coffee precursor into a milling chamber; b) introducing particles of soluble coffee into the milling chamber; c) jetting a gas into the milling chamber to mobilize the particles of the roasted coffee precursor and soluble coffee; d) thereby producing a milled and blended coffee product by comminuting the particles of the roasted coffee precursor by self-collision of the particles of the roasted coffee precursor and by collision of the particles of soluble coffee with the particles of the roasted coffee precursor within the milling chamber. Processes and products incorporating milled and blended coffee products are also described.

19 Claims, 13 Drawing Sheets

(51) Int. Cl.
  *A23F 5/08* (2006.01)
  *A23F 5/30* (2006.01)
  *A23F 5/34* (2006.01)
  *A23F 5/40* (2006.01)
  *B65D 85/804* (2006.01)
  *A47J 31/44* (2006.01)

(52) U.S. Cl.
  CPC .............. *A23F 5/405* (2013.01); *A47J 31/44* (2013.01); *B65D 85/804* (2013.01); *B65D 85/8043* (2013.01); *B65D 85/8046* (2013.01)

(56) References Cited

U.S. PATENT DOCUMENTS

| | | | |
|---|---|---|---|
| 1,989,415 A | 1/1935 | Hartman | |
| 2,154,963 A | 4/1939 | Swager | |
| 2,282,708 A | 5/1942 | Dantzig | |
| 2,316,207 A | 4/1943 | Winter | |
| 2,418,275 A | 4/1947 | O'Toole et al. | |
| 2,785,070 A | 3/1957 | Kester et al. | |
| 2,857,683 A | 10/1958 | Schytil | |
| 2,859,116 A | 11/1958 | Heimbs et al. | |
| 2,958,472 A | 11/1960 | Erickson et al. | |
| 3,120,439 A | 2/1964 | Reale | |
| 3,132,949 A | 5/1964 | Crowe | |
| 3,261,689 A | 7/1966 | Ponzoni | |
| 3,476,711 A | 11/1969 | Muller | |
| 3,565,635 A | 2/1971 | Mahlmann | |
| 3,595,668 A | 7/1971 | Nutting et al. | |
| 3,615,667 A | 10/1971 | Joffe | |
| 3,615,668 A | 10/1971 | Smith, Jr. | |
| 3,652,292 A | 3/1972 | Bach et al. | |
| 3,671,263 A | 6/1972 | Patel et al. | |
| 3,678,597 A | 7/1972 | Stuhlmann et al. | |
| 3,697,288 A | 10/1972 | McSwiggin | |
| 3,749,378 A | 7/1973 | Rhodes | |
| 3,768,172 A | 10/1973 | Klein et al. | |
| 3,821,430 A | 6/1974 | Reves et al. | |
| 3,821,450 A | 6/1974 | Stauber | |
| 3,840,188 A | 10/1974 | Coombe et al. | |
| 3,964,175 A | 6/1976 | Sivetz | |
| 4,193,758 A | 3/1980 | Peterson et al. | |
| 4,215,151 A | 7/1980 | Rios et al. | |
| 4,390,131 A | 6/1983 | Pickrel | |
| 4,553,704 A | 11/1985 | Wilson et al. | |
| 4,582,264 A | 4/1986 | Stephanoff et al. | |
| 4,591,508 A | 5/1986 | Pultinas, Jr. | |
| 4,594,257 A | 6/1986 | Leblanc | |
| 4,698,916 A | 10/1987 | Farber | |
| 4,722,849 A | 2/1988 | Dartey et al. | |
| 4,859,473 A | 8/1989 | Arciszewski et al. | |
| 4,860,461 A | 8/1989 | Tamaki et al. | |
| 4,875,904 A | 10/1989 | Munk | |
| 4,934,608 A | 6/1990 | Sylla et al. | |
| 4,963,743 A | 10/1990 | Satake et al. | |
| 4,970,804 A | 11/1990 | Huttlin | |
| 4,988,590 A | 1/1991 | Price et al. | |
| 4,997,671 A | 3/1991 | Spanier | |
| 5,000,943 A | 3/1991 | Scaglione et al. | |
| 5,034,609 A | 7/1991 | Satake et al. | |
| 5,071,668 A | 12/1991 | Van Lengerich et al. | |
| 5,155,923 A | 10/1992 | Wireman et al. | |
| 5,223,292 A | 6/1993 | Thulin et al. | |
| 5,230,281 A | 7/1993 | Wireman et al. | |
| 5,236,132 A | 8/1993 | Rowley, Jr. | |
| 5,257,574 A | 11/1993 | Hiromichi | |
| 5,292,005 A | 3/1994 | Wireman et al. | |
| 5,307,733 A | 5/1994 | Enomoto | |
| 5,372,826 A | 12/1994 | Holtz et al. | |
| 5,394,623 A | 3/1995 | Sewell | |
| 5,423,132 A | 6/1995 | Graber | |
| 5,436,023 A | 7/1995 | Avera | |
| 5,544,821 A | 8/1996 | Gupta et al. | |
| 5,567,048 A | 10/1996 | Hammonds | |
| 5,577,467 A | 11/1996 | Bormann | |
| 5,598,979 A | 2/1997 | Rowley, Jr. | |
| 5,604,994 A | 2/1997 | Annen et al. | |
| 5,609,097 A | 3/1997 | Newnan | |
| 5,616,356 A | 4/1997 | Buhler et al. | |
| 5,620,145 A | 4/1997 | Masuda | |
| 5,718,164 A | 2/1998 | Finken et al. | |
| 5,725,898 A | 3/1998 | Murphy et al. | |
| 5,791,066 A | 8/1998 | Crews | |
| 5,853,788 A | 12/1998 | Murphy et al. | |
| 5,855,326 A | 1/1999 | Beliavsky | |
| 5,894,029 A | 4/1999 | Brown et al. | |
| 5,899,391 A | 5/1999 | Goehner et al. | |
| 5,915,814 A | 6/1999 | Crews | |
| 5,958,494 A | 9/1999 | Tidland et al. | |
| 5,984,212 A | 11/1999 | Andreae-Jackering | |
| 6,010,732 A | 1/2000 | Van Lengerich et al. | |
| 6,051,266 A | 4/2000 | Totsuka | |
| 6,135,370 A | 10/2000 | Arnold | |
| 6,207,211 B1 * | 3/2001 | Wasserman et al. | 426/466 |
| 6,214,397 B1 | 4/2001 | Tidland | |
| 6,227,473 B1 | 5/2001 | Arnold | |
| 6,260,479 B1 | 7/2001 | Friedrich et al. | |
| 6,270,708 B1 | 8/2001 | Gurol | |
| 6,395,051 B1 | 5/2002 | Arnold et al. | |
| 6,405,948 B1 | 6/2002 | Hahn et al. | |
| 6,517,015 B2 | 2/2003 | Rowley, Jr. | |
| 6,530,534 B1 | 3/2003 | Farmer | |
| 6,564,470 B2 | 5/2003 | Krueger | |
| 6,607,768 B1 | 8/2003 | Eichner | |
| 6,971,594 B1 | 12/2005 | Polifka | |
| 7,207,504 B2 | 4/2007 | Willmot | |
| 2002/0022076 A1 | 2/2002 | Lanner et al. | |
| 2002/0027173 A1 | 3/2002 | Polifka | |
| 2002/0046475 A1 | 4/2002 | Cho et al. | |
| 2002/0197360 A1 | 12/2002 | Lamp et al. | |
| 2003/0080224 A1 | 5/2003 | Rowley, Jr. | |
| 2004/0142078 A1 | 7/2004 | Eichner | |
| 2004/0182957 A1 | 9/2004 | Gomez | |
| 2005/0098669 A1 | 5/2005 | Polifka | |
| 2005/0132893 A1 | 6/2005 | Arora et al. | |
| 2006/0029703 A1 | 2/2006 | Shah et al. | |
| 2006/0040027 A1 | 2/2006 | Shah et al. | |
| 2006/0045951 A1 | 3/2006 | Shah et al. | |
| 2006/0083834 A1 | 4/2006 | Shah et al. | |
| 2006/0088634 A1 | 4/2006 | Shah et al. | |
| 2006/0286230 A1 | 12/2006 | Shah et al. | |
| 2006/0286232 A1 | 12/2006 | Shah et al. | |
| 2006/0286246 A1 | 12/2006 | McPherson et al. | |
| 2006/0286269 A1 * | 12/2006 | Shah et al. | 426/618 |
| 2007/0292577 A1 | 12/2007 | Kopp et al. | |

FOREIGN PATENT DOCUMENTS

| | | |
|---|---|---|
| DE | 1692238 A1 | 10/1971 |
| DE | 19700084 A1 | 7/1998 |
| DE | 20313389 U1 | 11/2003 |
| EP | 0213645 A1 | 3/1987 |
| EP | 0220889 A2 | 5/1987 |
| EP | 0420509 A1 | 4/1991 |
| EP | 0560609 | 9/1993 |
| EP | 0787528 B1 | 7/1999 |
| EP | 0928561 | 7/1999 |
| EP | 1136129 A1 | 9/2001 |
| EP | 1627688 A1 | 2/2006 |
| EP | 1623633 A3 | 3/2006 |
| EP | 1631151 | 3/2006 |
| EP | 1733628 A1 | 12/2006 |
| EP | 1733811 A1 | 12/2006 |
| EP | 1733624 B1 | 8/2008 |
| EP | 1733625 B1 | 8/2008 |
| FR | 2406956 A1 | 5/1979 |
| FR | 2662584 A1 | 12/1991 |
| GB | 1141552 A | 1/1967 |
| GB | 1060178 | 3/1967 |
| GB | 1102587 A2 | 2/1968 |
| GB | 2006603 A | 5/1979 |
| GB | 2022394 A | 12/1979 |
| GB | 1564094 A | 4/1980 |

(56) References Cited

FOREIGN PATENT DOCUMENTS

| | | |
|---|---|---|
| JP | 5320466 | 2/1978 |
| JP | 5476866 | 6/1979 |
| JP | S5526887 A | 2/1980 |
| JP | 62111671 A | 5/1987 |
| JP | 05192248 | 8/1993 |
| JP | 2001231452 | 8/2001 |
| JP | 2001231452 A | 8/2001 |
| JP | 2007006818 | 1/2007 |
| JP | 2007006818 A | 1/2007 |
| JP | 2007521935 A | 8/2007 |
| WO | WO98/51413 | 4/1998 |
| WO | WO00/01256 A | 1/2000 |
| WO | WO01/21316 A1 | 3/2001 |
| WO | WO03/006166 A1 | 1/2003 |
| WO | WO2005/058073 A1 | 6/2005 |
| WO | WO2006047465 A1 | 4/2006 |
| WO | WO2006026752 A1 | 9/2006 |
| WO | WO2006049828 A1 | 11/2006 |
| WO | 2010/005604 A1 | 1/2010 |

OTHER PUBLICATIONS

Extended European search report by European Patent Office dated Sep. 2, 2013 for Application No. 13178967.9 (6 pgs.).

European search report by European Patent Office dated Sep. 20, 2013 for Application No. 13178972.9 (9 pgs.).

First Office Action from State Intellectual Property Office, P.R. China dated Nov. 4, 2013 for Application No. 201180044673.1 (13 pgs.).

Huslin, a., "A Mighty Wind Against Waste," washingtonpost.com (Monday, Dec. 9, 2002, p. A01), a printout of: http://www.washingtonpost.com/ac2!wp-dyn?pagename=article&node=&contentID=A28285-2002Dec8&notFound=true, 6 pages, Feb. 16, 2004.

Lewis. S., "Kansas Chicken Twisters," Engineers' Forum of Virginia Tech, a printout of: http://filebox.vt.edu/englforum/issue_archive/2003_2_april/12_chicken_twisters.htm, 2 pages, Nov. 13, 2003.

Garofalo, E, Wichita Eagle Newspaper Article, 1 page, undated.

Ichiu, K., "Method for Roasting and Pulverizing Coffee Bean and Apparatus Therefor," Patent Abstract of Japan, Publication No. 03219837 A, Sep. 27, 1991, 1 page, JPO&Japio.

Sadakatsu, S., "Apparatus for Roasting and Grinding Coffee Bean," Patent Abstracts of Japan, Publication No. 03266965 A, Nov. 27, 1991, 1 page, JPO&Japio.

Sadakatsu, S., "Roaster for Coffee Bean," Patent Abstracts of Japan, Publication No. 03266966 A, Nov. 27, 1991, 1 page, JPO&Japio.

Sadakatsu, S., "Coffee Bean-Roasting and Milling Device," Patent Abstracts of Japan, Publication No. 04304872 A, Oct. 28, 1992, 1 page, JPO&Japio.

Haruyoshi, O., "Vortex Grinding and Vortex Grinding Device," Patent Abstracts of Japan. Publication No. 05277927 A, Oct. 26, 1993, 1 page, JPO&Japio.

Walton Feed Nutritional Content of whole Grains vs. Their Refined flours, http://waltonfeed.com/grain/flour.html, Nov. 1996.

Fife, B. "Are you eating Rancid Oils," http://www.jctonic.com/include/healingcrisis/20rancid_oils.htm, Jurak Corp. Word Wide, Inc. 2004, pp. 1-3.

Martin et al. "Fattcy acid profiles as discriminant parameters for coffee varieties differentiation." Talanta, vol. 54, Issue 2, Apr. 2001, pp. 291-297.

State Intellectual Property Office of People's Republic China Search Report dated Mar. 13, 2015 for Application No. 201410120623.2 (3 pgs.).

Office Action dated Jun. 24, 2015 in Russian Patent Application No. 2013103424 and English translation thereof (11 pages).

International Search Report and Written Opinion for PCT/US2011/044127 issued Oct. 18, 2011.

Search Report for parent GB1012034.3 application issued Nov. 4, 2010.

European Patent Office Communication pursuant to Article 94(3) EPC dated May 24, 2015 for European Application No. 11738552.6 (4 pgs.).

English translation of Office Action dated Oct. 5, 2015 for Ukrainian Patent Application No. 201301833 (3 pgs.).

English translation of Office Action Dated Nov. 20, 2015 for Russian Patent Application No. 2013103424 (3 pgs.).

English translation of Official Notice of Rejection mailed Dec. 24, 2014 for Japanese Patent Application No. 2013-519845 (5 pgs.).

Search Report of GB1012034.3 dated May 26, 2011.

Official Notice of Rejection mailed on Jan. 12, 2016 for Japanese Patent Application No. 2015-051029, English translation (8 pgs.).

\* cited by examiner

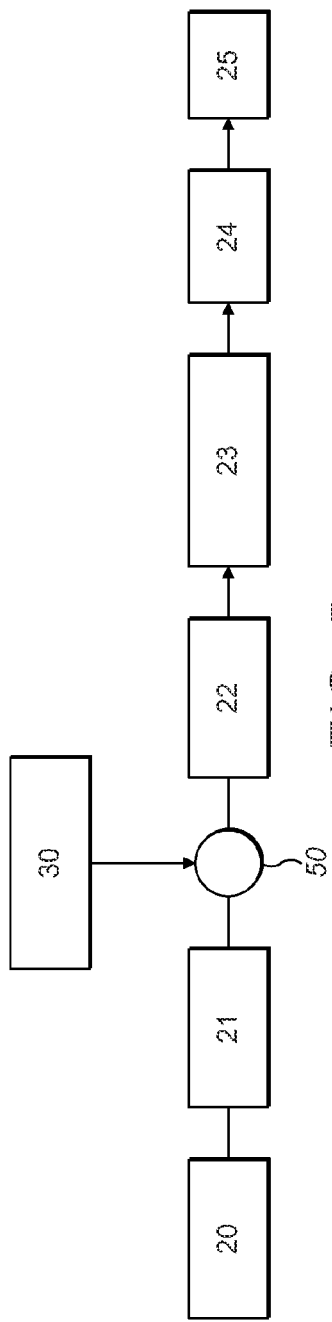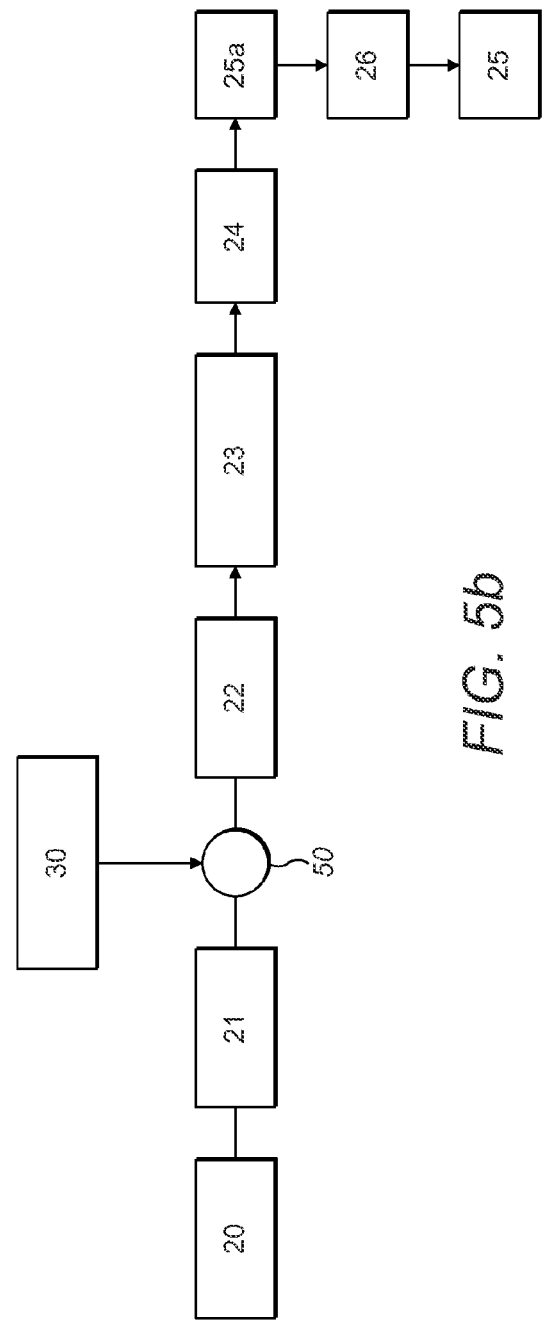

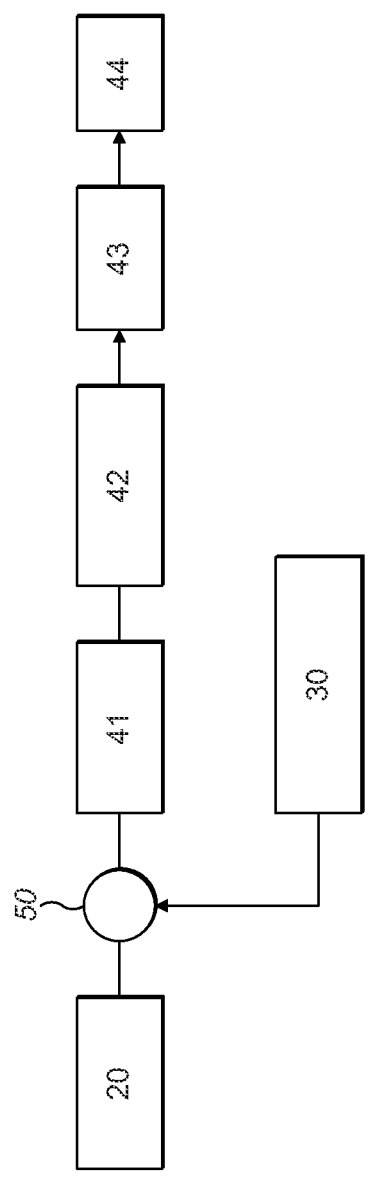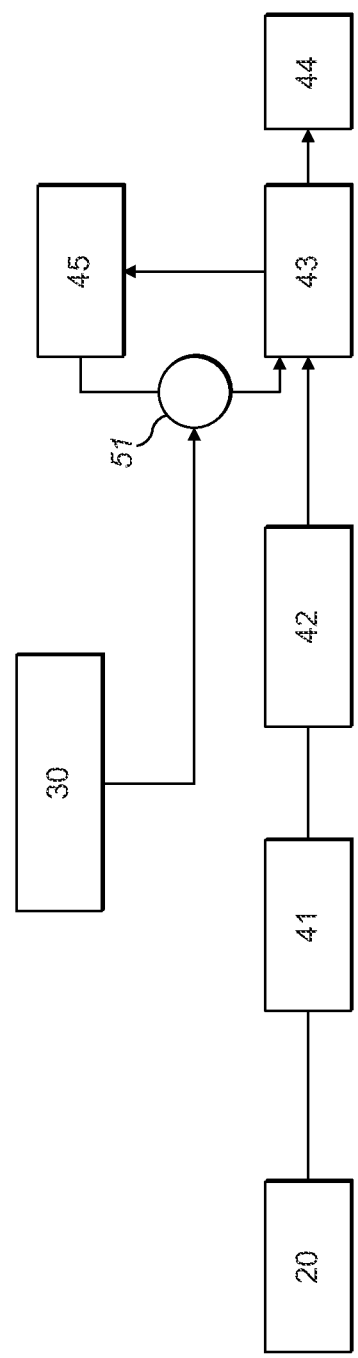

| Sample 1-1 (Comparative) | | |
|---|---|---|
| Feed to dryer concentration (%) | 56% | 56% |
| Drying time (Hrs) | 3.4 | 3.0 |
| SEM | 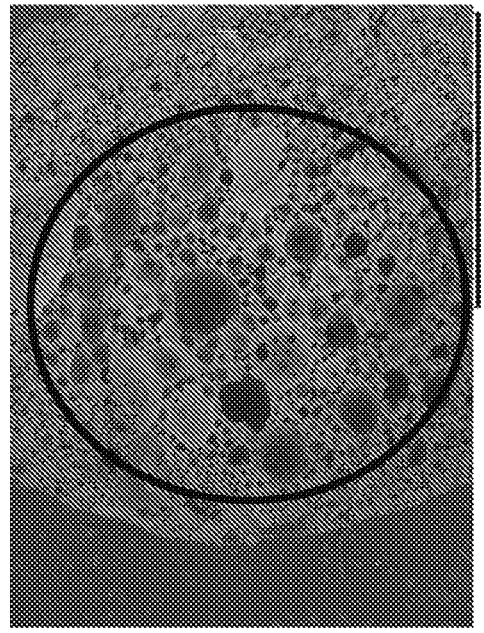 | 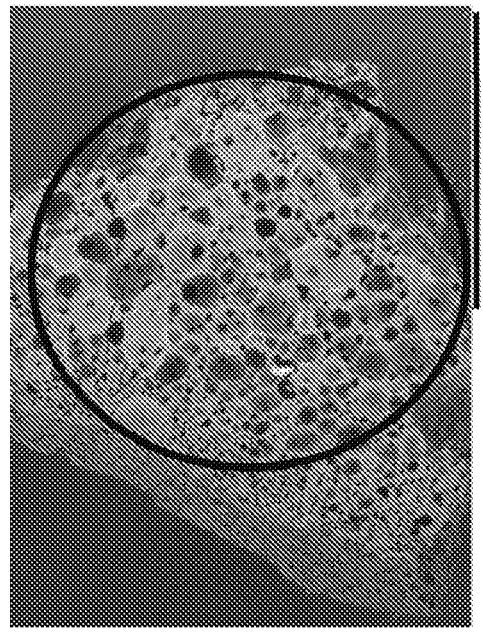 |
FIG. 12

| | Sample 2-1 | |
|---|---|---|
| Feed to dryer concentration (%) | 56% | 56% |
| Drying time (Hrs) | 3.0 | 3.4 |
| SEM | 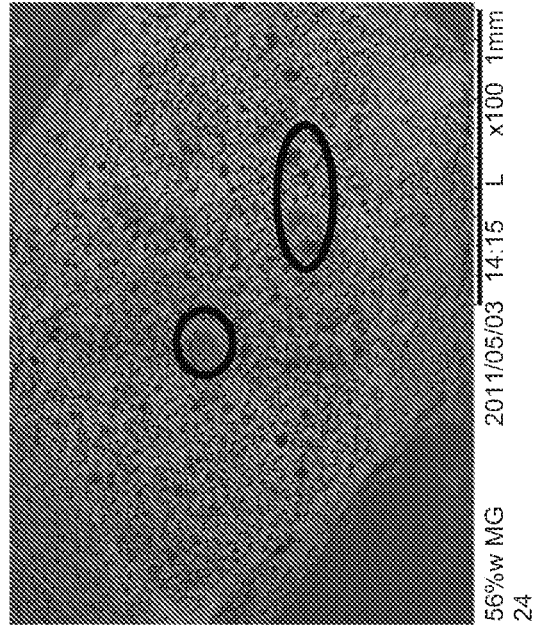 | 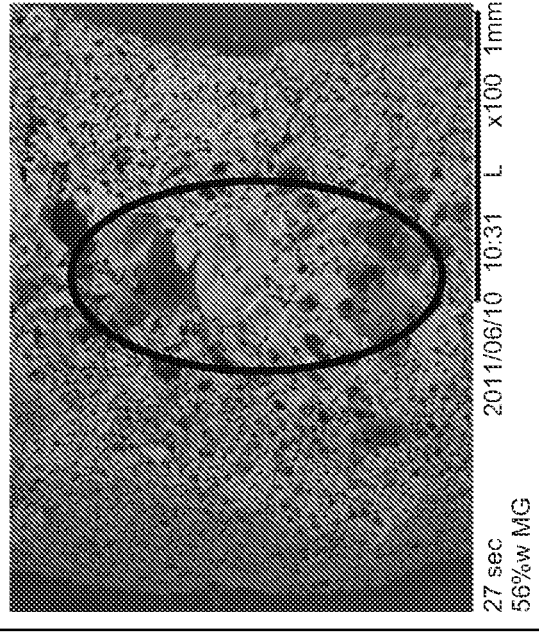 |
FIG. 13

COFFEE PRODUCTS AND RELATED PROCESSES

CROSS REFERENCE TO RELATED APPLICATIONS

This application is a U.S. national phase application of International Application No. PCT/US2011/044127, filed Jul. 15, 2011, designating the United States, which claims benefit from Great British Application No. 1012034.3, filed Jul. 16, 2010, both of which are hereby incorporated herein by reference in their entirety.

FIELD

The present application relates to coffee products and processes for forming coffee products. In particular, it relates to soluble coffee products incorporating a percentage of roasted ground coffee and processes for forming such products.

BACKGROUND

Instant soluble coffee products, such as freeze-dried and spray-dried instant coffee, are well known. An example of a freeze-dried instant coffee is Kenco® Smooth freeze dried coffee. Such instant soluble coffee products are formed by deriving a liquid coffee concentrate intermediate (commonly known as coffee liquor) from coffee beans by the well known processes of roasting and extraction. Optionally, the coffee concentrate may be aromatized by the addition of coffee aromas stripped from an extracted coffee intermediate, again as well known in the art. The coffee concentrate is then subjected to various foaming and drying steps to produce a dry granular end product that can be reconstituted into a coffee beverage by the addition of hot water.

Instant soluble coffee products are popular with consumers as they provide an economical, fast and simple way of preparing a coffee beverage. However, there has been a desire to produce instant soluble coffee products which are more reminiscent of roasted ground coffee products both in the appearance of the product prior to reconstitution and when consumed.

It is known to incorporate in a soluble coffee product a percentage of roasted ground coffee in order to attempt to produce a more appealing instant soluble coffee product. For example, WO2010/005604 describes various soluble coffee products blended from soluble and ground coffee components.

A problem that the present applicant has found with soluble coffee products incorporating a roasted ground coffee component is that it is difficult to adequately disperse the roasted ground coffee particles within the liquid coffee concentrate intermediate. Poor dispersion can lead to clumping of the roasted ground coffee particles on addition to the liquid coffee intermediate leading to non-hydrated regions of roasted ground coffee which never fully 'wet'.

Partly in order to try and overcome the problem of poor dispersion it has been known to try and reduce the roast and coffee particle size down to colloidal particle sizes of less than about 30 to 40 microns. For example, U.S. Pat. No. 4,594,257 describes an agglomerated instant coffee product comprising spray-dried instant coffee and roasted coffee colloidal particles having a particle size of 5 to 25 microns.

However, in order to produce colloidal sized particles of roasted ground coffee it is necessary to utilise special grinding processes since the coffee oil contained in the roasted ground coffee has a tendency to be released when the particles are ground to such a small size. Coffee oil release leads to detrimental affects on the grinding process such as clumping of the coffee particles and fouling of the grinding machine surfaces necessitating regular machine cleaning and consequent down time.

In order to overcome this problem it is known to cryogenically pre-freeze the roasted coffee beans prior to them being ground down to colloidal sizes. For example, in WO2010/005604 the roasted coffee beans are frozen to a temperature of about −5° C. and then pulverised into particles with a mean or median particle size of about 350 microns or less. In another example, GB2022394 describes a process of quenching roasted coffee beans in liquid nitrogen before being ground to a particle size of less than 45 microns.

The requirement to cryogenically freeze the roasted coffee beans prior to grinding increases the complexity and expense of the manufacturing process.

Another suggested solution to permit colloidal grinding of roasted coffee beans is to add additional oil to the grinding mixture to provide additional lubrication. Whilst this can in some situations overcome the problem of fouling of the grinding machine surfaces it results in a ground coffee product with a high oil content that is not ideal for use as a coffee intermediate for further processing into an instant soluble coffee beverage since only a relatively small amount can be added to products without a detrimental affect on the product composition.

Another suggested solution in EP1631151 is to add an additional component such as cocoa mass or sugar to absorb any coffee oil released by the roasted and ground coffee. However, this process is unsuitable where the desire is to use the colloidal roasted ground coffee in a pure soluble coffee beverage.

Another known desire is to attempt to make the visual appearance of the instant soluble coffee product more like that of roasted ground coffee. Typically, instant soluble coffee products are lighter in colour than roasted ground coffee. There has therefore been a desire to darken the colour of instant soluble coffee products, in particular freeze-dried soluble coffee. Prior art methods for darkening the colour of soluble coffee include the use of steam darkeners as described in EP0700640 and re-wetting of a freeze-dried intermediate as described in EP0090561. In addition $CO_2$ gasification has been used to darken soluble coffee products.

However, prior art techniques for darkening the appearance of a soluble coffee product have certain drawbacks. Re-wetting of the intermediate coffee product by addition of water or use of steam or the use of gases, such as $CO_2$, can alter the density and solubility of the end product.

BRIEF SUMMARY OF THE DISCLOSURE

In this specification unless otherwise required by the context, the term "roasted coffee" means a coffee substance that has been produced by the roasting of green coffee beans. The substance may be in the form of a roasted coffee bean or in some other form produced by onward processing steps such as grinding, decaffeination, pressing, etc. Particular examples of roasted coffee include roasted coffee beans, roasted expeller cake, roasted and flaked coffee.

In this specification unless otherwise required by the context, the term "roasted ground coffee" means a roasted coffee substance that has been subject to a comminution process in order to reduce the particle size of the original roasted coffee substance. Again, unless otherwise required by the context the comminution process may include one or more of grinding, chopping, pounding and crushing.

In this specification, the term "Helos particle size distribution D90", means the 90th percentile figure by volume of the particle size distribution, as obtained from a Helos™ laser light diffraction particle size analyzer available from Sympatec, Clausthal-Zellerfeld, Germany. That is, the D90 is a value on the distribution such that 90% by volume of the particles have a characteristic size of this value or less. The figure may be obtained for a dry sample (referred to as "dry Helos") or for a wet sample (referred to as "wet Helos"), e.g. after mixing of the particles with water. Likewise for D50 where the value represents the 50th percentile figure of the particle size distribution.

Helos is a laser diffraction sensor system for which one evaluation method is applied over the whole measuring range from 0.1 μm to 8750 μm. This instrument is designed for particle size analysis of dry and wet samples, i.e. of powders, suspensions, emulsions or sprays.

For wet Helos measurements, the beverage is made up to 1.5% concentration (3 g solids in 200 ml water) using 100° C. water and dripped into cuvette (with magnetic stirrer coated with PTFE running at 1000 RPM) to aim for an optical concentration between 20 and 25%. When using ultrasound, an integrated sonication finger made from Titanium can be lowered manually into the cuvette.

There are three options to measure particle size on the Helos system:

| Method name | Measuring range | Application | Settings used for micro milled coffee |
|---|---|---|---|
| Dry PSD | 0.1-3500 μm (1.8-250 μm with R4) | Direct measurement for milled product | Lens: R4 Copt 1.5% ref, 20 s Dispersion 100% 4 mm 3 bar |
| Wet PSD | 0.1-3500 μm (0.5-175 μm with R3) | Allows dissolution of soluble coffee product and gives roasted ground particle size formed in cup by hand stirring | Lens: R3 Cuvette settings |
| Wet PSD with ultrasound | 0.1-3500 μm (0.5-175 μm with R3) | Allows dissolution of soluble coffee and break-up of roasted ground clumps giving better indication of individual particle size | Lens: R3 Cuvette settings Ultrasonication time 60 sec |

Dry Particle Size Distribution is measured using HELOS/KF, R4 Lens, RODOS/M Dispersing System and VIBRI Feeder manufactured by Sympatec GmbH.

Wet Particle Size Distribution is measured using HELOS/KF, R3 Lens, CUVETTE Dispersing System manufactured by Sympatec GmbH.

In this specification, the reference to colour in "La units" means the unit reading measured using visible light reflectance of a sample of the roasted ground or soluble coffee using a Dr. Lange® Colour Reflectance Meter Model LK-100 with an internal 640 nm filter, available from Dr. Lange GmbH, Dusseldorf, Germany. The La scale is based on the Hunter 1948 L,a,b, color space, where the L component measures 'lightness' with L=0 being black and L=100 being a perfect diffuse reflector. Therefore the lower the La number the darker the sample measured.

In a first aspect, the present disclosure describes a freeze-dried soluble coffee product comprising 5 to 30% by dry weight roasted ground coffee and 70 to 95% by dry weight equivalent soluble coffee, wherein the roasted ground coffee has a dry Helos particle size distribution D90 of less than or equal to 100 microns; the freeze-dried soluble coffee product having a colour of 13 to 30 La units on the Lange scale.

Preferably, the freeze-dried soluble coffee product comprises 10 to 20% by dry weight roasted ground coffee and 80 to 90% by dry weight equivalent soluble coffee. In one example, the freeze-dried soluble coffee product comprises 15% by dry weight roasted ground coffee and 85% by dry weight equivalent soluble coffee.

It will be appreciated that whilst the freeze-dried soluble coffee product has been described as comprising both roasted ground coffee and soluble coffee this does not preclude the possibility of the product also comprising additional components.

Surprisingly, it has been found that the incorporation of roasted ground coffee of small particle size into a freeze-dried soluble coffee product produces a darker end product that is more visually reminiscent of roasted ground coffee.

By comparison, prior art freeze-dried soluble coffee products typically have a colour of greater than 25 La units Even use of the prior art process of gasification was unable to produce an end product with a colour of less than 21 La units.

Further, prior art roasted ground coffee typically has a colour of 6 to 13 La units.

Preferably the roasted ground coffee has a dry Helos particle size distribution D90 of less than or equal to 50 microns, more preferably less than or equal to 30 microns.

Preferably the freeze-dried soluble coffee product has a colour of 16 to 25 La units on the Lange scale. More preferably the freeze-dried soluble coffee product has a colour of 17 to 20 La units on the Lange scale.

Preferably the freeze-dried soluble coffee product has a density of 185 to 265 g/liter. More preferably the freeze-dried soluble coffee product has a density of 205 to 235 g/liter. In one example the freeze-dried soluble coffee product has a density of 225 g/liter.

Advantageously, the darkening of the end product by addition of roasted ground coffee particles allows an end product to be produced that achieves consumer-expected density and solubility levels.

Preferably the freeze-dried soluble coffee product has a particle size range of 0.3 to 3.5 mm. More preferably the freeze-dried soluble coffee product has a particle size range of 0.3 to 2.5 mm. In one example the freeze-dried soluble coffee product has a particle size range of 0.3 to 1.5 mm.

The freeze-dried product is enabled to be ground and sieved to a particle size that is reminiscent of a roasted ground coffee product.

The roasted ground coffee may be obtained by known processes such as cryogenic milling of roasted coffee beans as well known in the art and described, by way of example, in GB2022394 noted above. However, preferably the roasted ground coffee is obtained by the novel comminution process of a fourth aspect of the present disclosure as will be described further below.

Preferably, the freeze-dried soluble coffee product is produced by the novel process of a second aspect of the present disclosure which will be described further below.

In a second aspect, the present disclosure describes a process of forming a freeze-dried soluble coffee product, comprising the steps of:

i) forming a concentrated coffee extract;
ii) foaming and pre-freezing the concentrated coffee extract to form a foamed and pre-frozen coffee intermediate;
iii) freezing the foamed and pre-frozen coffee intermediate to form a frozen coffee intermediate;
iv) grinding and sieving the frozen coffee intermediate to form a ground coffee intermediate;
v) drying the ground coffee intermediate to form the freeze-dried soluble coffee product;

wherein prior to step ii) and/or step iii) a milled and blended coffee intermediate is incorporated;

wherein the milled and blended coffee intermediate comprises 10 to 80% by dry weight roasted ground coffee and 20 to 90% by dry weight soluble coffee.

In a third aspect, the present disclosure describes a process of forming a spray-dried soluble coffee product, comprising the steps of:
i) forming a concentrated coffee extract;
ii) foaming the concentrated coffee extract to form a foamed coffee intermediate;
iii) optionally filtering and homogenizing the foamed coffee intermediate to form a filtered and homogenized coffee intermediate;
iv) spray drying the foamed coffee intermediate or the filtered and homogenized coffee intermediate to form the spray-dried soluble coffee product;

wherein prior to step ii) and/or step iv) a milled and blended coffee intermediate is incorporated;

wherein the milled and blended coffee intermediate comprises 10 to 80% by dry weight roasted ground coffee and 20 to 90% by dry weight soluble coffee.

Surprisingly, it has been found that incorporating a milled and blended coffee intermediate (formed from roasted ground coffee particles and soluble coffee particles) as part of the soluble coffee forming process results in very good dispersion of the roasted ground particles throughout the concentrated coffee extract Preferably, the milled and blended coffee intermediate of the second or third aspects comprises 10 to 70% by dry weight roasted ground coffee and 30 to 90% by dry weight soluble coffee. More preferably, the milled and blended coffee intermediate of the second or third aspects comprises 15 to 50% by dry weight roasted ground coffee and 50 to 85% by dry weight soluble coffee. In one example the milled and blended coffee intermediate of the second or third aspects comprises 50% by dry weight roasted ground coffee and 50% by dry weight soluble coffee.

It will be appreciated that whilst the milled and blended coffee intermediate of the second or third aspects has been described as comprising both roasted ground coffee and soluble coffee this does not preclude the possibility of the intermediate also comprising additional components.

Preferably, the milled and blended coffee intermediate of the second or third aspects has a dry Helos particle size distribution D90 of less than or equal to 40 microns. More preferably the milled and blended coffee intermediate of the second or third aspects has a dry Helos particle size distribution D90 of less than or equal to 30 microns.

Preferably, in the process of the second or third aspects the freeze-dried or spray-dried coffee product comprises 5 to 30% by dry weight roasted ground coffee and 70 to 95% by dry weight equivalent soluble coffee. More preferably the freeze-dried or spray-dried coffee product comprises 10 to 20% by dry weight roasted ground coffee and 80 to 90% by dry weight equivalent soluble coffee. In one example the freeze-dried or spray-dried coffee product comprises 15% by dry weight roasted ground coffee and 85% by dry weight equivalent soluble coffee.

It will be appreciated that whilst the freeze-dried or spray-dried coffee product has been described as comprising both roasted ground coffee and soluble coffee this does not preclude the possibility of the product also comprising additional components.

The soluble coffee of the milled and blended coffee intermediate may comprise spray-dried instant coffee, freeze-dried instant coffee, or a mixture thereof.

The ground coffee intermediate of the process of forming a freeze-dried soluble coffee product described above prior to drying may have a total coffee solids concentration of greater than or equal to 52% and less than or equal to 63%.

The coffee intermediate of the process of forming a spray-dried soluble coffee product described above prior to drying may have a total coffee solids concentration of greater than or equal to 52% and less than or equal to 63%.

In either case the total coffee solids concentration may preferably be 56% to 60%.

The second and third aspects of the present disclosure extend to a soluble coffee product produced by the above described processes.

In addition, the second and third aspects of the present disclosure extend to a coffee beverage formed using the soluble coffee product described above.

In a fourth aspect, the present disclosure describes a coffee milling process comprising the steps of:
a) introducing particles of a roasted coffee precursor into a milling chamber;
b) introducing particles of soluble coffee into the milling chamber;
c) jetting a gas into the milling chamber to mobilise the particles of the roasted coffee precursor and soluble coffee;
d) thereby producing a milled and blended coffee product by comminuting the particles of the roasted coffee precursor by self-collision of the particles of the roasted coffee precursor and by collision of the particles of soluble coffee with the particles of the roasted coffee precursor within the milling chamber.

Advantageously, comminuting the roasted coffee precursor in this manner has been found to provide an excellent means for reducing the particle size of the roasted coffee without the deleterious effects previously encountered by release of coffee oil from the roasted coffee precursor. Without wishing to be bound by theory, it is understood that the incorporation of the particles of soluble coffee into the milling chamber results in the soluble coffee absorbing some, and preferably most or all of the coffee oil released during comminution.

Advantageously, the particles of soluble coffee are actively used as a comminuting agent within the milling chamber by impacting the particles of the roasted coffee precursor with the particles of soluble coffee. There will of course be some comminution of the roasted coffee precursor by self-collision—in other words, particles of roasted coffee precursor impacting other particles of roasted coffee precursor. However, it has been found that the additional comminution caused by impacting the roasted coffee precursor with particles of soluble coffee produces an enhanced milling action. This is particularly surprising considering that the particles of soluble coffee are not particularly hard.

If preferred, the mobilised roasted coffee particles can be directed to impact additional surfaces, such as impact plates, of the milling chamber to provide additional comminution effects. However, the use of such impacts is not essential to the process.

The particles of the roasted coffee precursor and the soluble coffee may be mixed together before introduction into the milling chamber. For example, the ingredients may be batch mixed in the dry form and introduced into the milling chamber via a common hopper feed.

Alternatively the particles of the roasted coffee precursor and the soluble coffee may be introduced separately into the milling chamber. For example separate hoppers for the roasted coffee precursor and the soluble coffee precursor may be provided.

Another possibility is the use of a single feed line which may be used to jet one precursor into the milling chamber which acts to entrain the other precursor into the flow.

Preferably the particles of the roasted coffee precursor in step a) are at a temperature of between 5 and 30 degrees Celsius.

Preferably the milling chamber is not subject to cryogenic cooling during steps b), c) and d).

A particular advantage of the aspects of the present disclosure is that cryogenic cooling of the roasted coffee precursor to prevent coffee oil release is not required, even where the milling is down to colloidal particle sizes. The coffee precursor may optionally be subject to some pre-chilling before milling, for example by being refrigerated to a temperature as low as 5 degrees Celsius. However, the roasted coffee precursor may also be used at ambient temperature (typically 20 to 25 degrees Celsius).

In addition, it is not essential that the physical components of the milling apparatus (chamber walls, feed lines, etc.) are cooled. However, it may be desirable to chill the jetting gas in order to help remove moisture during the milling process. The chilled gas will result in some cooling of the milling apparatus. However, this is significantly less than typically results during cryogenic cooling. The gas may be at a temperature between −20 degrees Celsius and ambient temperature. In one example gas at a temperature of −16 degrees Celsius was used.

The absence of active cooling (or the use of minimal cooling as described above) considerably reduces the complexity of the machinery required for the milling process, speeds up the process time and reduces the costs associated with the milling stage of the process.

Preferably the milled and blended coffee product produced in step d) comprises 10 to 80% by dry weight roasted ground coffee and 20 to 90% by dry weight soluble coffee. More preferably the milled and blended coffee product produced in step d) comprises 10 to 70% by dry weight roasted ground coffee and 30 to 90% by dry weight soluble coffee. Even more preferably the milled and blended coffee product produced in step d) comprises 15 to 50% by dry weight roasted ground coffee and 50 to 85% by dry weight soluble coffee. In one example the milled and blended coffee product produced in step d) comprises 50% by dry weight roasted ground coffee and 50% by dry weight soluble coffee. Milling to produce a product containing above 70% by dry weight roasted ground coffee may be made possible where the feed gas is chilled down to a temperature of around −20 degrees Celsius as discussed above. Otherwise limiting the percentage of roasted ground coffee in the product to a maximum of 70% is preferred.

It will be appreciated that whilst the milled and blended coffee product has been described as comprising both roasted ground coffee and soluble coffee this does not preclude the possibility of the product also comprising additional components.

Preferably in step d) the comminution results in the milled and blended coffee product having a dry Helos particle size distribution D90 of less than or equal to 40 microns. More preferably in step d) the comminution results in the milled and blended coffee product having a dry Helos particle size distribution D90 of less than or equal to 30 microns.

The particles of roasted coffee precursor may be whole roasted coffee beans or coarsely-ground roasted coffee beans. The process finds application with whole roasted coffee beans which provides a simplified process route. However, if desired, an initial coarse grind of the roasted coffee beans can be carried out before the roasted coffee is inserted into the milling chamber.

The particles of soluble coffee may be particles of spray-dried instant coffee, particles of freeze-dried instant coffee, or a mixture thereof.

There may be advantages in using a soluble coffee type that matches the type of end product that the milled and blended coffee product is to be utilised in. For example, where ultimately the milled and blended coffee product is to be incorporated in a freeze-dried coffee product then the soluble coffee product used as a comminuting agent in the milling chamber may be chosen also to be freeze-dried soluble coffee. However, the types of soluble coffee used in the process may be mixed and altered as desired.

Preferably the gas jetted into the milling chamber in step b) is nitrogen, air, or a mixture thereof.

The milling chamber may form part of a jet mill. Examples of such mills include fluid bed opposed jet mills, Jet-O-Mizer™ mills, vortex mill, spiral mills, etc.

The fourth aspect of the present disclosure extends to a milled and blended coffee product produced by the process described above.

The milled and blended coffee product may be used as a milled and blended coffee intermediate in the processes of the second and third aspects of the present disclosure described above. Alternatively, the milled and blended coffee product may be used in the onward production of other coffee-based products. Further, the milled and blended coffee product may be packaged and sold as an end product in its own right.

The present disclosure extends to a container containing the milled and blended coffee product described above or the soluble coffee product described above or the freeze-dried soluble coffee product described above.

The container may be a bottle, a jar, a tin, a refill pack, a sachet, a stick pack, a filter bag or a container suitable for use in a beverage preparation machine such as a flexible pad formed at least partly from filtering material, or a rigid, semi-rigid or flexible cartridge formed from substantially air- and water-impermeable materials.

The container may further contain one or more additional beverage components such as natural or artificial sweeteners, dairy or non-dairy based creamers, lactose, vegetable fat, whey proteins, emulsifiers, stabilisers, modified starches, carriers, fillers, flavours, colours, nutrients, preservatives, flow agents or foaming agents.

The present disclosure extends to a beverage preparation machine in combination with at least one container suitable for use in said beverage preparation machine such as a flexible pad formed at least partly from filtering material, or a rigid, semi-rigid or flexible cartridge formed from substantially air- and water-impermeable materials, said at least one container containing the milled and blended coffee product described above or the soluble coffee product described above or the freeze-dried soluble coffee product described above.

The present disclosure extends to method of making a beverage comprising the step of mixing the milled and blended coffee product described above or the soluble coffee product described above or the freeze-dried soluble coffee product described above with an aqueous liquid, preferably hot water.

The mixing may be performed by a beverage preparation machine. Alternatively, the mixing may be by hand in a receptacle.

BRIEF DESCRIPTION OF THE DRAWINGS

Embodiments of the present disclosure will now be described, by way of example only, with reference to the accompanying drawings, in which:

FIG. 4b is a flow diagram illustrating a modification of the process of FIG. 4a;

FIG. 5a is a flow diagram illustrating another process for forming a freeze-dried soluble coffee product according to the present disclosure;

FIG. 5b is a flow diagram illustrating a modification of the process of FIG. 5a;

FIG. 6 is a flow diagram illustrating a process for forming a spray-dried soluble coffee product according to the present disclosure;

FIG. 7 is a flow diagram illustrating another process for forming a spray-dried soluble coffee product according to the present disclosure;

FIGS. 12 to 15 show scanning electron microscope photographs of various sample products.

DETAILED DESCRIPTION

In one aspect of the present disclosure a milled and blended coffee product may be produced by comminuting a roasted coffee precursor in a milling apparatus such as a jet mill. A suitable jet mill is the Jet-O-Mizer™ mill available from Fluid Energy Processing and Equipment Company, Telford, Pa., USA. Another suitable mill is the Hosokawa Alpine Fluid Bed Opposed Jet Mill—AFG, available from Hosakawa Micron Ltd, Runcorn, Cheshire, United Kingdom. Other suitable milling apparatus include mills referred to as spiral mills and vortex mills.

Figure 1:
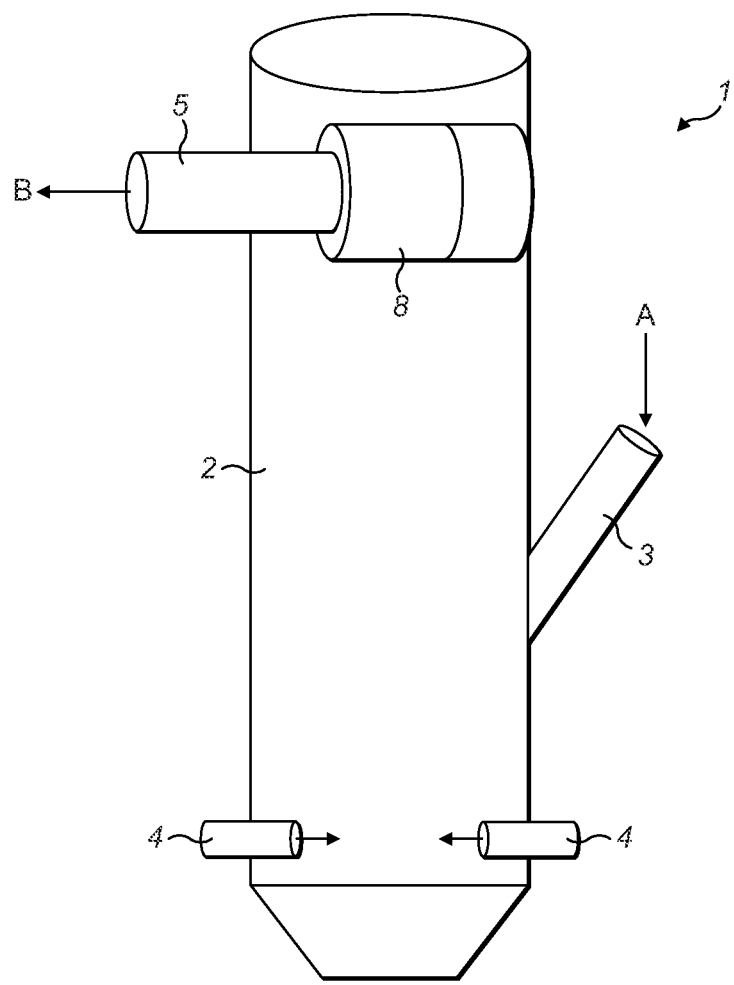
FIG. 1 is a schematic illustration of the workings of a jet mill.

A schematic illustration of the working principles of a jet mill is shown in FIG. 1. The mill 1 comprises a milling chamber 2 having a feed inlet 3, a series of gas inlets 4, a size classification wheel 8 and a product outlet 5.

The milling chamber 2 of FIG. 1 takes the form of a generally cylindrical body having the gas inlets 4 at a lower end and spaced around the periphery and the product outlet 5 located near an upper end.

The feed inlet 3 communicates with the milling chamber 2 to allow ingredient precursor(s), in the form of whole or coarsely-ground roasted coffee beans and soluble coffee particles, to be fed into the milling chamber 2 tangentially at a location at or near the chamber periphery.

The size classification wheel 8 is located near the upper end of the milling chamber 2 and is adapted to received comminuted particles from the chamber 2 and pass those under a desired particle size to the product outlet 5.

The roasted coffee precursor and the soluble coffee precursor are dry batch mixed at the required ratio and then deposited in a hopper which communicates with the feed inlet 3 as shown schematically in FIG. 1 by arrow A. A feed gas supply may be provided to entrain the precursors from the hopper and convey them to the chamber 2.

Compressed gas is supplied in use to the plurality of gas inlets 4. The gas inlets 4 are orientated at an angle to the radial direction of the chamber 2—preferably tangentially to the chamber 2—such that flow of gas through the gas inlets 4 sets up a swirling, spiralling gas flow within the chamber 2.

In use, to comminute the roasted coffee precursor, the precursors are fed into the chamber 2 and mobilised in the chamber 2 by the high speed flow of gas entering the chamber 2 through the gas inlets 4 (and also the feed gas (where used) entering with the precursors through the feed inlet 3).

Comminution occurs due to the high velocity collisions between the particles of roasted coffee precursor and the soluble coffee resulting in pulverisation of the roasted coffee precursor. As the particle size reduces the smaller particle sizes move up the chamber 2 into the size classification wheel 8. The size classification wheel 8 acts to classify the particles it receives and pass onward to the product outlet 5 those particles less than a desired particle size. The particles exit the mill as shown schematically in FIG. 1 by arrow B. The larger particles are retained in the chamber and are subject to further comminution. Thus, the jet mill also helps to classify the particle size output through the product outlet 5.

Depending on the type of jet mill, the orientation and configuration of the milling chamber 2, gas inlets 4, and product outlet 5 can be altered.

The gas supplied to the gas inlets 4 and the feed gas for conveying the roasted coffee precursor into the chamber 2 may be air, but is preferably an inert gas, such as nitrogen. The feed gas may be dehumidified and/or chilled in order to help remove moisture from the chamber 2 generated during milling. Dehumidification may be, for example, by use of a desiccant- or compressor-based dehumidifier. In addition, or alternatively, the gas supplied to the gas inlets 4 may be chilled.

The roasted coffee precursor may be whole roasted coffee beans or alternatively may be coffee beans that have been coarsely ground using a conventional milling process to have a particle size of greater than 100 microns.

The soluble coffee may be a spray-dried or freeze-dried instant coffee product. The particle size of the soluble coffee product before jet milling is typically between 100 and 350 microns for spray-dried soluble coffee and 0.1 to 3.5 mm for freeze-dried soluble coffee.

It is not necessary for the mill 1 to be subjected to cryogenic cooling prior or during the milling process. Rather, the mill 1 is preferably operated at substantially the ambient temperatures existing at the location where the mill 1 is situated.

As noted above, the feed gas and/or gas supplied to the gas inlets may optionally be chilled which may result in a modicum of cooling of the apparatus components. For example it has been found that the throughput of the jet mill may be beneficially increased by using cool gas supplied to the gas inlets 4, for example to a temperature of −16 degrees Celsius, in particular where the ratio of dry weight of roasted ground coffee to dry weight soluble coffee in the milled and blended coffee product is greater than 50%. In particular this may allow the percentage by dry weight of the roasted ground coffee in the mix to be up to 80%. The following results were achieved using a Roto-Jet 15 mill available from Fluid Energy Processing and Equipment Company, Telford, Pa., USA. The mill was fed with 100% Arabica beans roasted to 8 La. The pressure to the gas inlets 4 was 7 bar and the supplied gas was desiccated air which was cooled to +5 degrees Celsius for the first sample and −16 degrees Celsius for the second sample. For both samples the classifier of the jet mill was controlled to produce a particle size distribution D90 of 30 microns.

| Ratio of roasted ground coffee to soluble coffee | Mill | Grinding Air Temp | Total Throughput (kg/hr) | Equivalent roast & ground coffee throughput kg/hr |
|---|---|---|---|---|
| 70/30 | Fluid bed Jet-Mill | +5° C. | 20.9 | 14.6 |
| 70/30 | Fluid bed Jet-Mill | −16° C. | 68.2 | 47.7 |

As can be seen, use of an air temperature of −16 degrees Celsius results in a significant increase in the throughput of the jet mill while still maintaining the required particle size distribution.

However, it is to be noted that this is still a relatively high temperature compared to prior art cryogenic cooling processes and it is to be noted that the roasted coffee precursor and soluble coffee are not subject to cryogenic cooling before entering the jet mill.

The roasted coffee precursor is not subjected to cryogenic cooling or any cryogenic pre-treatment prior to milling. Typically, the temperature of the roasted coffee precursor when filled into the hopper 6 will be in the range 5 to 30° C. The roasted coffee precursor may be at the ambient room temperature of the milling apparatus.

The milled and blended coffee product obtained from product outlet 5 comprises 20 to 90% by dry weight soluble coffee and 10 to 80% by dry weight roasted ground coffee. Preferably the milled and blended coffee product obtained from product outlet 5 comprises 30 to 90% by dry weight soluble coffee and 10 to 70% by dry weight roasted ground coffee. More preferably the milled and blended coffee product comprises 50 to 85% by dry weight soluble coffee and 15 to 50% by dry weight roasted ground coffee. In one example the milled and blended coffee product comprises 50% by dry weight soluble coffee and 50% by dry weight roasted ground coffee.

After milling, the milled and blended coffee product has a particle size distribution with a dry Helos particle size distribution D90 of less than or equal to 40 microns, more preferably less than or equal to 30 microns.

EXAMPLES

Figure 2:
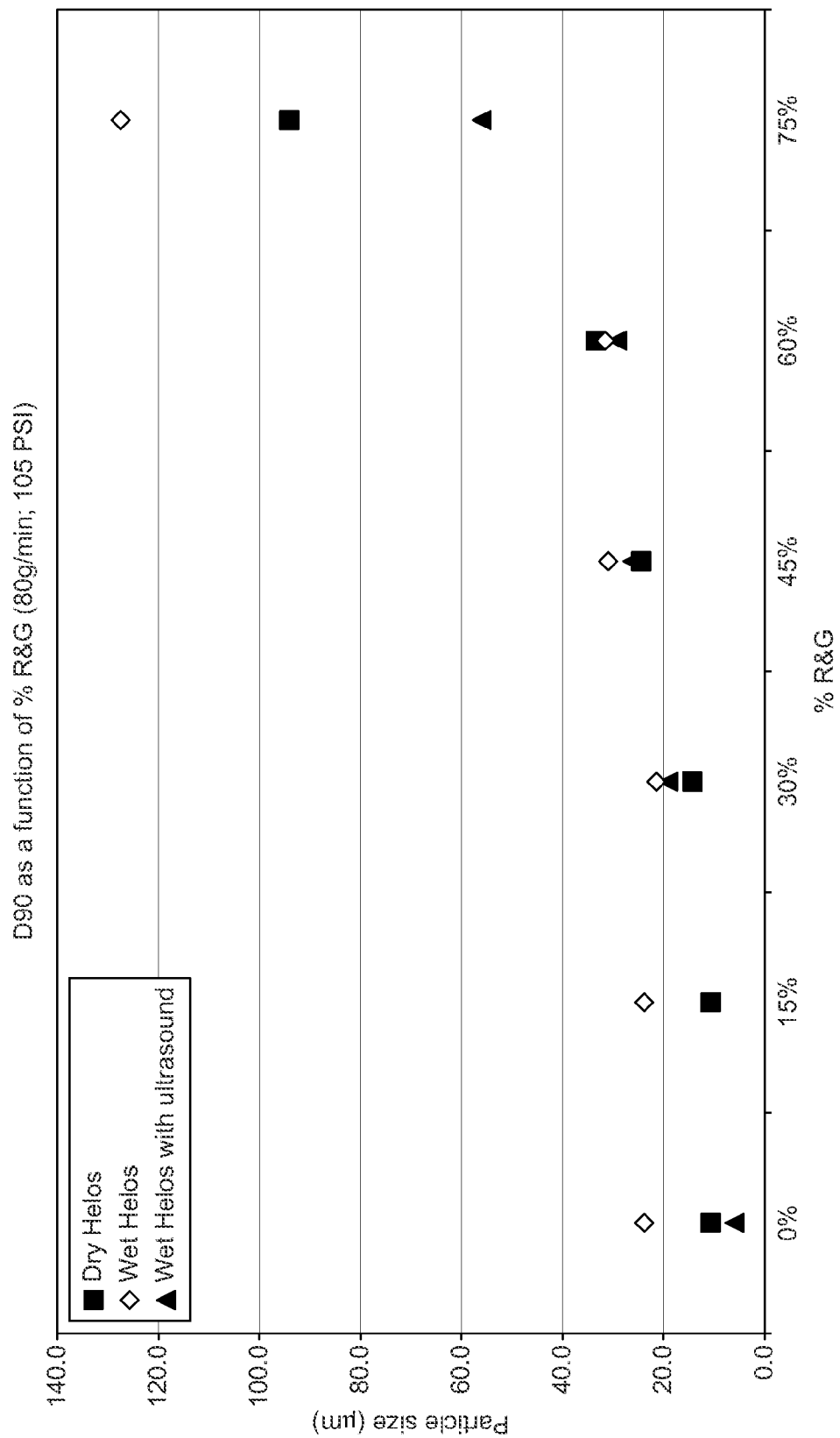
FIG. 2 is a graph of particle size in microns against Helos particle size distribution D90.

FIG. 2 shows results for the dry Helos particle size distribution D90 (and in addition wet Helos figures) for milled and blended coffee products produced according to the present disclosure as a function of the dry weight percentage of roasted ground coffee present. As can be seen, from 10 to 70% of roasted ground coffee the dry Helos particle size distribution D90 is less than or equal to 40 microns. Above 70% roasted ground coffee the dry Helos particle size distribution D90 increases deleteriously. (As noted above, this may be ameliorated by chilling the feed gas to the jet mill). At or below 50% roasted ground coffee a dry Helos particle size distribution D90 of 30 microns or less is achievable.

In a separate example, a blend of Brazilian and Columbian Arabica beans was roasted to a colour of 11.5 La and pre-ground to a D50 of 500 microns. The resulting roasted coffee precursor was dry batch mixed with Arabica spray-dried coffee at a ratio of 50% roasted coffee precursor to 50% spray-dried coffee precursor. The resultant blend was then milled in a Hosokawa Alpine Fluid Bed Opposed Jet Mill—AFG at a variety of feed rates and classifiers speeds. The following results were obtained:

| Feed Rate (kg/hour) | Classifier Speed (RPM) | Run time (mins.) | Dry Helos D50 | Dry Helos D90 |
|---|---|---|---|---|
| 120 | 2350 | 30 | 10.5 | 27.5 |
| 50 | 2000 | 38 | 11.4 | 28.7 |
| 50 | 2000 | 60 | 11.0 | 27.2 |

Advantageously, as can be seen for each example a dry Helos particle size distribution D90 of less than 30 microns was obtainable at a range of feed rates and classifier speeds.

Another aspect of the present disclosure relates to processes for producing novel soluble instant coffee products incorporating a milled and blended coffee product containing a percentage of roasted ground coffee.

Figure 3:
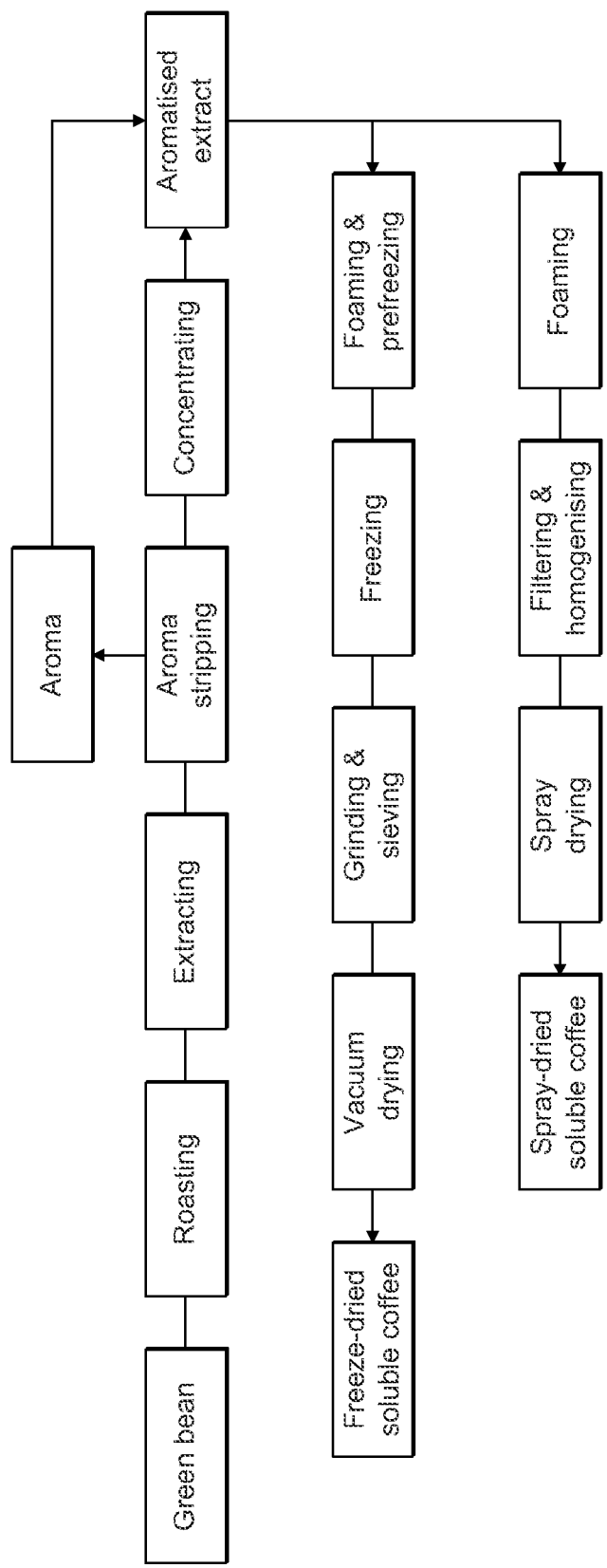
FIG. 3 is a flow diagram illustrating prior art processes for forming freeze-dried and spray-dried soluble coffee.

Prior art processes for forming spray-dried and freeze-dried soluble coffee both start with the steps of producing a coffee concentrate intermediate from coffee beans by the processes of roasting and extraction. FIG. 3 illustrates the stages involved. Green coffee beans are roasted and then ground before being added to water to extract the coffee bean constituents. Optionally, coffee aroma may be stripped at this point to produce a liquid aroma product. The extraction liquid is then concentrated, for example in percolation columns to produce a concentrated extract, commonly known as coffee liquor. Optionally, at this point the previously produced aroma product may be incorporated to produce an aromatised coffee concentrate intermediate. Such processes are well known.

The remainder of the procedure depends on whether the soluble product is to be spray-dried or freeze-dried. For spray-dried soluble coffee the remaining process steps include foaming, filtering and homogenising and spray drying to produce the spray-dried product. For freeze-dried soluble coffee the remaining process steps include foaming and pre-freezing, freezing, grinding & sieving and vacuum drying.

According to the present disclosure these known processes are adapted by the incorporation of a milled and blended coffee intermediate containing a percentage of roasted ground coffee. In each of the processes described below, the milled and blended coffee intermediate itself may contain 10 to 80% by dry weight roasted ground coffee and 20 to 90% by dry weight soluble coffee. Preferably, the milled and blended coffee intermediate contains 10 to 70% by dry weight roasted ground coffee and 30 to 90% by dry weight soluble coffee. More preferably, the milled and blended coffee intermediate contains 15 to 50% by dry weight roasted ground coffee and 50 to 85% by dry weight soluble coffee. In one example the milled and blended coffee intermediate comprises 50% by dry weight soluble coffee and 50% by dry weight roasted ground coffee.

The soluble coffee component of the milled and blended coffee intermediate in any of the processes below may be derived from spray-dried instant coffee, freeze-dried instant coffee, or a mixture thereof.

The milled and blended coffee intermediate preferably has a dry Helos particle size distribution D90 of less than or equal to 40 microns, more preferably less than or equal to 30 microns.

In each of the processes described below the end coffee product may comprise 5 to 30% by dry weight roasted ground coffee and 70 to 95% by dry weight equivalent of soluble coffee. (For example, a soluble coffee end product containing 15% by dry weight roasted ground coffee and 85% by dry weight equivalent soluble coffee can be obtained by mixing the liquid coffee concentrate with a dry milled and blended coffee intermediate having 50% by dry weight roasted ground coffee and 50% by dry weight soluble coffee in a ratio of 70:30 coffee concentrate intermediate to milled and blended coffee intermediate.

In a preferred option, the milled and blended coffee intermediate is produced using the novel process of the present disclosure described above with reference to FIG. 1. However, milled and blended coffee intermediates having the requisite percentages of roasted ground coffee and soluble coffee may be used, even where produced by alternative means.

Figure 4A:
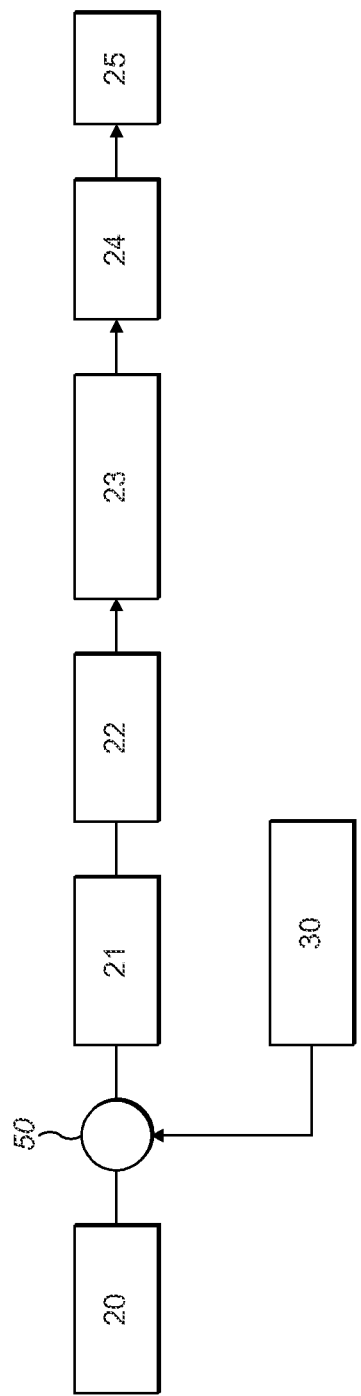
FIG. 4a is a flow diagram illustrating a process for forming a freeze-dried soluble coffee product according to the present disclosure.

FIG. 4a shows a first freeze-dried process for forming a freeze-dried soluble coffee product 25. A coffee concentrate intermediate 20 (aromatised or non-aromatised) is mixed with a milled and blended coffee intermediate 30 using a high shear mixer 50 prior to the foaming and pre-freezing step 21. Suitable mixers include high shear batch mixers and high shear in-line mixers available from Silverson Machines Ltd, Chesham, United Kingdom. The mixture is then foamed and pre-frozen at step 21 and then fed to a belt freezer 22 for a further freezing step. The frozen intermediate is then ground and sieved at step 23 to produce a particle size range of 0.3 to 3.5 mm, preferably 0.3 to 2.5 mm, more preferably 0.3 to 1.5 mm. The intermediate is then vacuum dried at step 24 to produce the freeze-dried soluble coffee product 25. The product may then be packed in a container.

Figure 4B:
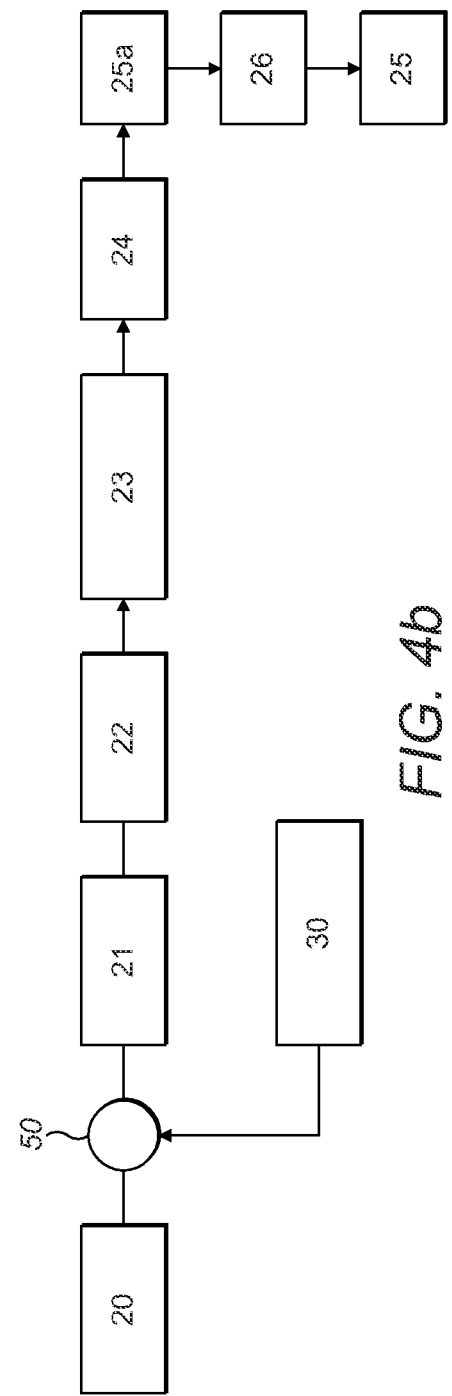

A modification to the process of FIG. 4a is shown in FIG. 4b. The process is as described above with reference to FIG. 4a up to step 22. At step 23, however, the frozen intermediate is ground and sieved to produce a larger particle size range of 1.0 to 3.5 mm. The intermediate is then vacuum dried at step 24 to produce an intermediate freeze-dried soluble coffee product 25a. At step 26 the intermediate freeze-dried soluble coffee product 25a is subject to a secondary grinding to reduce the particle size range to 0.3 to 1.5 mm to produce the freeze-dried soluble coffee product 25. The product may then be packed in a container.

FIG. 5a shows a second freeze-dried process for forming a freeze-dried soluble coffee product 25. The process is the same as the first process described above with reference to FIG. 4a with the exception that the milled and blended coffee product 30 is incorporated after the foaming and pre-freezing step 21. Again, a high shear mixer 50 of the type described above may be used and in other respects the process is the same as the first process.

A modification to the process of FIG. 5a is shown in FIG. 5b. The process is as described above with reference to FIG. 5a up to step 22. At step 23, however, the frozen intermediate is ground and sieved to produce a larger particle size range of 1.0 to 3.5 mm. The intermediate is then vacuum dried at step 24 to produce an intermediate freeze-dried soluble coffee product 25a. At step 26 the intermediate freeze-dried soluble coffee product 25a is subject to a secondary grinding to reduce the particle size range to 0.3 to 1.5 mm to produce the freeze-dried soluble coffee product 25. The product may then be packed in a container.

An advantage of the modified processes of FIGS. 4b and 5b is that the particle size during vacuum drying is larger than in the processes of FIGS. 4a and 5a which has been found to lead to less product losses during drying. It has been found that with the processes of FIGS. 4a and 5a potential product losses occur when vacuum drying very small particle sizes due to the particles being carried off along with the evaporating water content of the intermediate.

A further advantage of each of the freeze-drying processes of the present disclosure described above is that it has been surprisingly found that a better freeze-drying performance is achieved and a higher concentration of soluble solids can be incorporated in the product prior to freeze drying where finely milled roasted ground coffee is included.

The term 'freeze-drying performance' refers to the avoidance of dried product quality problems, specifically melt-back and sticky lumps. 'Melt-back' refers to the failure to remove water from each granule structure by sublimation during freeze drying, and 'sticky lumps' arise from the failure to remove water vapour that has sublimated from individual granules from the overall coffee bed tray.

A typical freeze drying process involves freezing of foamed coffee extract on a cold room belt. When frozen, the coffee slab is granulated and sieved to a particular granule size before drying in a freeze-dryer.

The capacity of a freeze dryer is limited by its de-watering ability. The amount of water in the frozen coffee particles fed to the freeze-drier is dependent on the concentration of total coffee solids of the liquid coffee extract when it is frozen. The higher the coffee solids concentration the lower the water content and thus the freeze-drier requires less utilisation of its capacity to remove that water.

Therefore for a given de-watering ability of a freeze-drier one might attempt to increase product throughput by increasing the solids concentration fed to the dryer. However, increasing the concentration has previously been found to have a detrimental effect on product quality such as melt back of product and production of sticky lumps of agglomerated granules. Because of this limitation, it has been previously accepted that the feed extract should contain no more than about 50% total coffee solids.

However, according to the processes and products of the present disclosure it has been found that total coffee solids concentrations of up to 63% can be fed to a freeze-drier while avoiding melt-back and sticky lumps. For example, superior extracts of 56% and 60% concentration may be formed with 15% (by dry weight) of finely milled roasted ground coffee, with a particle size D50 of 30 to 40 microns and a D99 of below 60 microns, and 85% (by dry weight) of pure soluble coffee solids.

EXAMPLES

To illustrate the improved drying performance and product qualities, the following freeze-dried samples were prepared. In each case, the base extract was prepared by re-dissolving freeze-dried granules and adding water to make the required concentration of coffee solids. Drying was carried out under the same conditions for all samples: the dryer was a Rayl model available from GEA Niro, of Soeborg, Denmark;

samples were dried in a standard tray with the heating profile, initial product weight, particle size of feed material to dryer being identical.

Sample 1-1 (Comparative)

The final extract had a coffee solids concentration of 56% (exclusively pure soluble coffee solids) and was foamed by air, frozen, grinded, sieved between 0.7 mm-3.35 mm sizes, and finally vacuum dried. Ice coffee granules were frozen at −40 degrees C. and vacuum dried for 3.0 hrs or 3.4 hrs.

|  | Frozen and grinded coffee granules before drying | Dry product after freeze-drying |
| --- | --- | --- |
| Water (%) | 44 | 0 |
| Soluble coffee solids (%) | 56 | 100 |
| Insoluble coffee solids (%) | 0 | 0 |

Sample 2-1

The final extract had a coffee solids concentration of 56% (made-up by soluble coffee solids from the base extract and coffee solids from the finely milled roasted ground coffee added before foaming with the end product comprising 15% by dry weight roasted ground coffee and 85% by dry weight equivalent soluble coffee) and was foamed by air, frozen, grinded, sieved between 0.7 mm-3.35 mm sizes and finally dried. Ice coffee granules were frozen at −40 degrees C. and vacuum dried for 3.0 hrs or 3.4 hrs.

|  | Frozen and grinded coffee granules before drying | Dry product after freeze-drying |
| --- | --- | --- |
| Water (%) | 44 | 0 |
| Soluble coffee solids (%) | 48 | 85 |
| Insoluble coffee solids (%) | 8 | 15 |

The presence of sticky lumps was quantified by sieving using a 3.35 mm size sieve, with the following results:

|  |  | Sample 1-1 (Comparative) |  | Sample 2-1 |  |
| --- | --- | --- | --- | --- | --- |
|  | Feed to Dryer concentration (%) | 56% | 56% | 56% | 56% |
|  | Drying time (Hrs) | 3.4 | 3.0 | 3.4 | 3.0 |
| Stickied granules | Free flow of product from tray | clumps | clumps | yes | yes |
|  | Quantity (%) | 60.9 | 65.9 | 0.4 | 0.1 |
| Physical quality | Density (g/100 ml) | 21.5 | 22.3 | 21.6 | 21.9 |

As can be seen the inclusion of finely milled roasted ground coffee substantially eliminates the presence of sticky lumps.

As well as comparison by sieving, direct visual comparison was made by scanning electron microscope (SEM) photographs. FIG. 12 shows SEM photographs of the dried coffee products of Sample 1-1. while FIG. 13 shows SEM photographs of the dried coffee products of Sample 2-1.

As can be seen from the photos, Samples 2-1 containing finely milled roasted ground coffee show fewer collapsed areas in their structure compared to pure soluble solids Samples 1-1.

Samples 1-2 (Comparative)

The final extract had a coffee solids concentration of 60%, (exclusively pure soluble coffee solids) and was foamed by air, frozen, grinded, sieved between 0.7 mm-3.35 mm sizes and finally vacuum dried. Ice coffee granules were frozen at −40 C and vacuum dried for 3.0 hrs.

|  | Frozen and grinded coffee granules before drying | Dry product after freeze-drying |
| --- | --- | --- |
| Water (%) | 40 | 0 |
| Soluble coffee solids (%) | 60 | 100 |
| Insoluble coffee solids (%) | 0 | 0 |

Samples 2-2

The final extract had a coffee solids concentration of 60% (made-up by soluble coffee solids from the base extract and coffee solids from the finely milled roasted ground coffee added before foaming with the end product comprising 15% by dry weight roasted ground coffee and 85% by weight equivalent soluble coffee) and was foamed by air, frozen, grinded, sieved between 0.7 mm-3.35 mm size and finally dried. Ice coffee granules were frozen at −40 C and vacuum dried for 3.0 hrs.

|  | Frozen and grinded coffee granules before drying | Dry product after freeze-drying |
| --- | --- | --- |
| Water (%) | 40 | 0 |
| Soluble coffee solids (%) | 51 | 85 |
| Insoluble coffee solids (%) | 9 | 15 |

Again, the presence of sticky lumps was quantified by sieving using a 3.35 mm size sieve, with the following results:

|  |  | Sample 1-2 (Comparative) | Sample 2-2 |
| --- | --- | --- | --- |
|  | Feed to Dryer concentration (%) | 60% | 60% |
|  | Drying time (Hrs) | 3.0 | 3.0 |
| Stickied granules | Free flow of product from tray | clumps | yes |
|  | Quantity (%) | 66 | 0 |
| Physical quality | Density (g/100 ml) | 22.0 | 22.7 |

Figure 14:
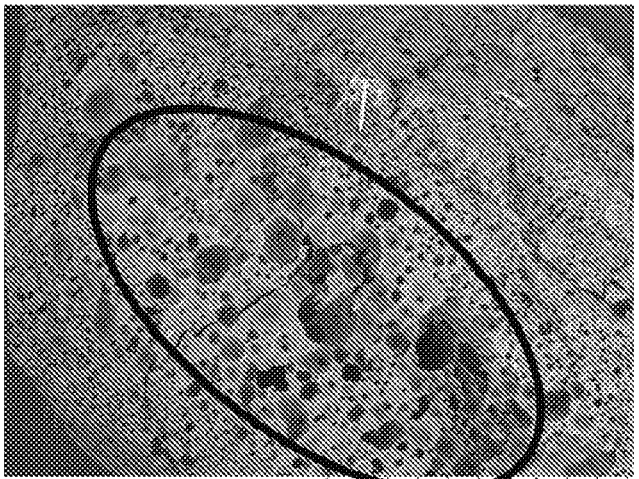
Figure 15:
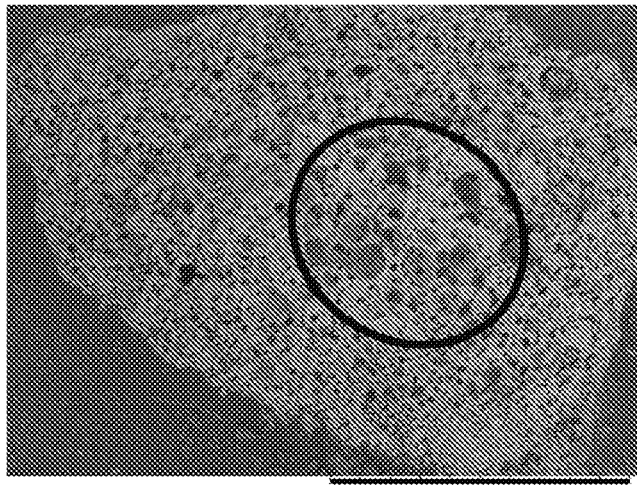

Direct visual comparison was made by scanning electron microscope (SEM) photographs. FIG. 14 shows an SEM photograph of the dried coffee product of Sample 1-2. while FIG. 15 shows an SEM photograph of the dried coffee product of Sample 2-2.

As can be seen from the photos, Sample 2-2 containing finely milled roasted ground coffee shows fewer collapsed areas in structure compared to Sample 1-2.

As another, separate benefit it has been found that the grinding of frozen coffee extract, which contains finely milled roasted ground coffee produces improved grinding performance in that fewer fines are generated compared to frozen coffee extracts formed from pure soluble coffee:

| Frozen coffee chips | Product (0.7-3.335 mm) | Fines (below 0.7 mm) |
|---|---|---|
| 56% concentration with finely milled roasted ground coffee | 80% | 20% |
| 56% concentration without finely milled roasted ground coffee | 75% | 25% |
| 60% concentration with finely milled roasted ground coffee | 79% | 21% |
| 60% concentration without finely milled roasted ground coffee | 75% | 25% |

For the grinding, the same machine, process and parameters were used: Grinder screen 8 mm, sieve screen 0.7-3.35 mm FIG. 6 shows a first spray-dried process for forming a spray-dried soluble coffee product 44. A coffee concentrate intermediate 20 (aromatised or non-aromatised) is mixed with a milled and blended coffee intermediate 30 using a high shear mixer 50 prior to the foaming step 41. A high shear mixer 50 of the type described above may be used. The mixture is then foamed at step 41 and then filtered and optionally homogenised at step 42. The intermediate is then spray dried at step 43 to produce the spray-dried soluble coffee product 44. The product may then be packed in a container.

FIG. 7 shows a second spray-dried process for forming a spray-dried soluble coffee product 44. The process is the same as the first spray-dried process described above with the exception that the milled and blended coffee product 30 is incorporated into a dry mix. In particular, the spray-drying apparatus (as known in the art) comprises a fines collector for recycling coffee powder fines. At step 51, the milled and blended coffee intermediate 30 is fed into the recycling line from the fines collector and is therefore incorporated into the product during the spray-drying stage.

It has been found that the milled and blended coffee intermediate formed by jet milling has very good dispersion characteristics in liquids (such as hot water or concentrated liquid coffee extract).

EXAMPLES

To illustrate the beneficial dispersion qualities of the jet milled and blended coffee intermediate, the following samples were prepared as follows:

Sample 1 (Comparative)

100% Arabica beans, roasted to colour 8.5 La, then cryogenically ground using prior art techniques. 15% by dry weight of the resultant ground material was then dry mixed by hand with 85% of Arabica-based dried soluble coffee—end composition 15% by dry weight roasted ground coffee, 85% by dry weight equivalent soluble coffee.

Sample 2

15% Arabica beans roasted to colour 8.5 La, then jet milled with 85% Arabica-based, dried soluble coffee—end composition 15% by dry weight roasted ground coffee, 85% by dry weight equivalent soluble coffee.

Sample 3

30% Arabica beans roasted to colour 8.5 La, then jet milled with 70% Arabica-based, dried soluble coffee to form blended intermediate. 50% by dry weight of blended intermediate dry mixed by hand with 50% by dry weight of Arabica-based dried soluble coffee—end composition 15% by dry weight roasted ground coffee, 85% by dry weight equivalent soluble coffee.

Sample 4

50% Arabica beans roasted to colour 8.5 La, then jet milled with 50% Arabica-based, dried soluble coffee to form blended intermediate. 30% by dry weight of blended intermediate dry mixed by hand with 70% by dry weight of Arabica-based dried soluble coffee—end composition 15% by dry weight roasted ground coffee, 85% by dry weight equivalent soluble coffee.

Beverages were then prepared from the samples and dry and wet Helos (with and without ultrasound) particle size distributions were measured, with the following results:

| Sample | % roasted ground coffee:% soluble coffee | Dry Helos D90 μm | Wet Helos - Stirred D90 μm | Wet Helos - Ultrasound D90 μm |
|---|---|---|---|---|
| 1 | 15:85 | 27.2 | 69.4 | 22.1 |
| 2 | 15:85 | 10.5 | 28.5 | 17.8 |
| 3 | 15:85 | 17.4 | 35.6 | 23.1 |
| 4 | 15:85 | 27.2 | 60.7 | 29.8 |

Wet Helos of the stirred sample represents the particle size when first made up and is higher where there is poor dispersion of the finely ground roasted coffee particles in water, thereby forming "clumps" of material.

That clumps are formed can be determined by comparing to the Wet Helos with ultrasound measurement. The ultrasound acts to break up the clumps (if present).

As can be seen from the results, the comparative Sample 1 formed with cryogenically-ground roasted coffee had poor dispersion characteristics and significant clumping—verified by the large difference between the wet Helos figures with and without ultrasound—even though the product had the same total roasted ground coffee content as Samples 2 to 4. By comparison, Samples 2 and 3 of the present disclosure have much better dispersion where the milled and blended coffee intermediate has 15 or 30% by dry weight roasted ground coffee. Sample 4 with 50% by dry weight roasted ground coffee shows some improvement over the prior art composition but less than Samples 2 and 3.

Another aspect of the present disclosure relates to a novel freeze-dried soluble coffee product having an appearance reminiscent of roasted ground coffee.

It has been surprisingly discovered that the addition of roasted ground coffee of small particle size to a freeze-dried soluble coffee product can produce a darkening of the end product that results in the freeze-dried product looking more similar to roasted ground coffee than prior art freeze-dried coffee products.

The roasted ground coffee particles are preferably colloidal in size with a dry Helos particle size distribution D90 of less than or equal to 100 microns, preferably less than or equal to 50 microns, more preferably less than or equal to 30 microns.

The roasted ground coffee may constitute 5 to 30% by dry weight of the freeze-dried product.

The roasted ground coffee may be derived from cryogenic milling of whole roasted coffee beans. However, preferably, the roasted ground coffee is obtained by the milling process of the present disclosure described above with reference to FIG. 1 in which the roasted ground coffee is a component of the milled and blended coffee intermediate.

The roasted ground coffee may be incorporated into the product by high shear mixing. Preferably, where the milled and blended coffee intermediate of the present disclosure is to be used, the roasted ground coffee is incorporated using one of the processes described above with reference to FIGS. 4 and 5.

The freeze-dried coffee end product has a colour of 13 to 30 La units on the Lange scale, preferably 16 to 25 La units, more preferably 17 to 20 La units.

The density of the soluble coffee product also has an affect on the colour. Typically the denser the product the darker the colour. However, it is undesirable to have a soluble product that is too dense. Hence the present disclosure provides a flexible alternative which can be used separately from (or in combination with) control of the density of the product to select the desired product colour.

Figure 8:
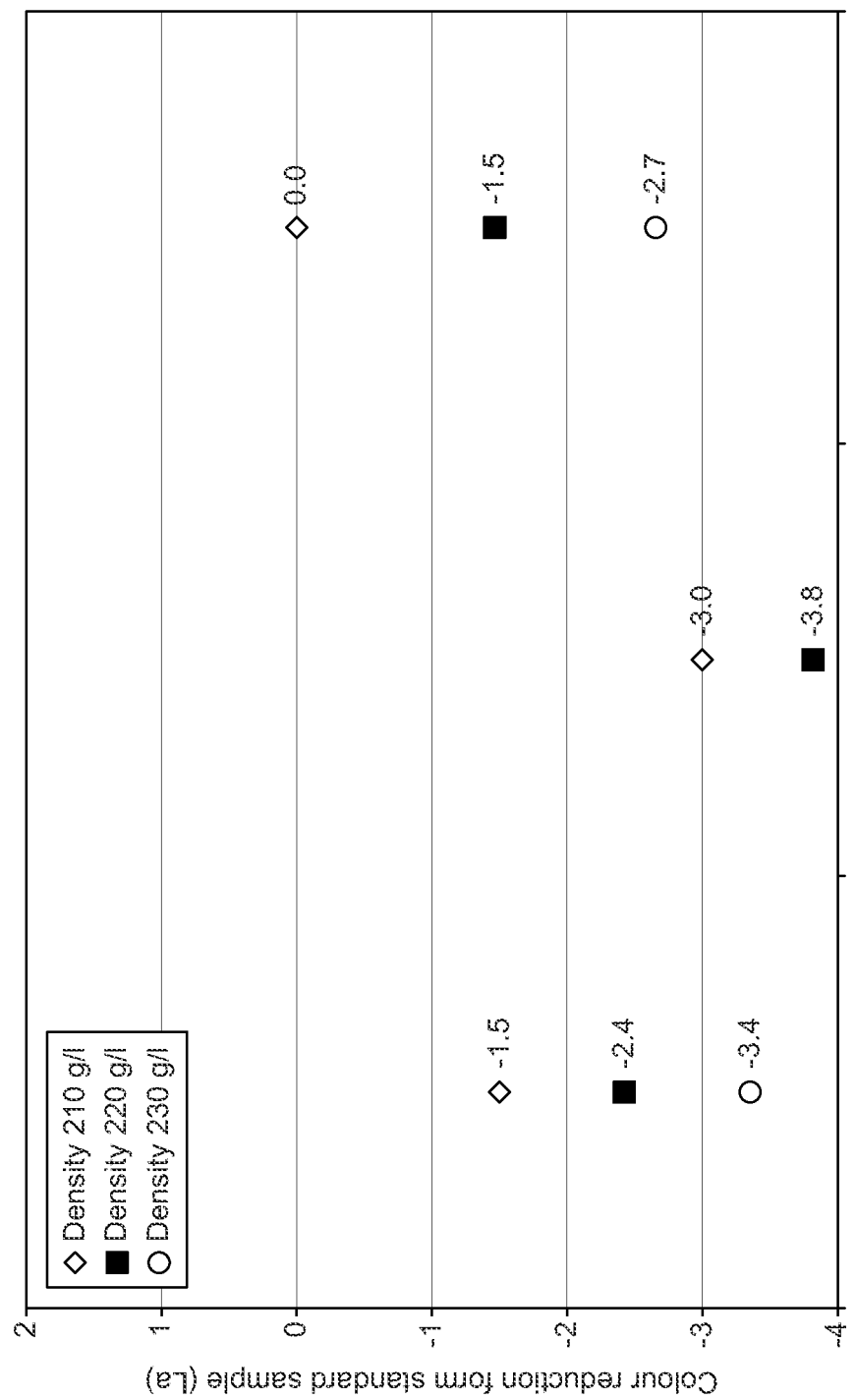
FIG. 8 is a graph of colour reduction in La units for various freeze-dried soluble coffee products.

FIG. 8 illustrates results for a first set of three sample products, A to C. For all three samples A to C the total solids (soluble coffee solids and roasted ground coffee solids where applicable) concentration of the product fed to the freeze-drier was 50% and the drying time was 3.37 hours. Samples A to C had the following characteristics:

Sample A (Comparative Example)

Standard Net Robusta concentrated extract was foamed and freeze-dried using known prior art techniques without the inclusion of any roasted ground coffee. The datum colour change of 0 is set for a density of Sample A of 210 g/l. An increased density of 220 g/l results in a colour change of −1.5 La units. An increased density of 230 g/l results in a colour change of −2.7 La units.

Sample B

A freeze-dried product according to the process of FIG. 5a with roasted ground coffee added after foaming with the end product comprising 15% by dry weight roasted ground coffee and 85% by dry weight equivalent soluble coffee.

Compared to Sample A, Sample B produced a darker product with a colour change of −3.0 La units at a density of 210 g/l; −3.8 La units at a density of 220 g/l.

Sample C

A freeze-dried product according to the process of FIG. 4a with roasted ground coffee added before foaming with the end product comprising 15% by dry weight roasted ground coffee and 85% by dry weight equivalent soluble coffee.

Compared to Sample A, Sample C produced a darker product with a colour change of −1.5 La units at a density of 210 g/l; −2.4 La units at a density of 220 g/l and −3.4 La units at a density of 230 g/l.

The results may be tabulated as follows:

| Sample | Density (g/l) | Color change from datum (La) |
|---|---|---|
| A | 210 | 0 |
| A | 220 | −1.5 |
| A | 230 | −2.7 |
| B | 210 | −3.0 |
| B | 220 | −3.8 |
| C | 210 | −1.5 |
| C | 220 | −2.4 |
| C | 230 | −3.4 |

The following table illustrate results for a second set of two sample groups of products D and E subjected to differing solids concentrations and drying times. Sample groups D and E had the following characteristics:

Sample D (Comparative Example)

Standard Net Arabica concentrated extract was foamed and freeze-dried without the inclusion of any roasted ground coffee. The datum colour change of 0 was set for a density of sample of 220 g/l for three conditions; feed to dryer solids concentration of 56% with 3 hrs drying time, feed to dryer solids concentration of 60% with 3 hrs drying time and feed to dryer solids concentration of 56% with 3.37 hrs drying time.

Sample E

A freeze-dried product according to the process of FIG. 4a with roasted ground coffee added before foaming with the end product comprising 15% by dry weight roasted ground coffee and 85% by dry weight equivalent soluble coffee and a density of 220 g/l. The same three conditions as Sample D were evaluated.

| Sample | Total solids concentration fed to dryer (%) | Drying time (Hrs) | Color change from datum (La) |
|---|---|---|---|
| D | 56 | 3.0 | 0 |
| E | 56 | 3.0 | −11.05 |
| D | 60 | 3.0 | 0 |
| E | 60 | 3.0 | −7.45 |
| D | 56 | 3.37 | 0 |
| E | 56 | 3.37 | −9.35 |

As can be seen from the data above, the inclusion of the roasted ground coffee produces a marked darkening of the end product compared to a pure soluble coffee product.

It has also been found that the freeze-dried product is more reminiscent of roasted ground coffee where it is ground at step 23 to a particle size of 0.3 to 3.5 mm, preferably 0.3 to 2.5 mm, more preferably 0.3 to 1.5 mm.

Figure 9:
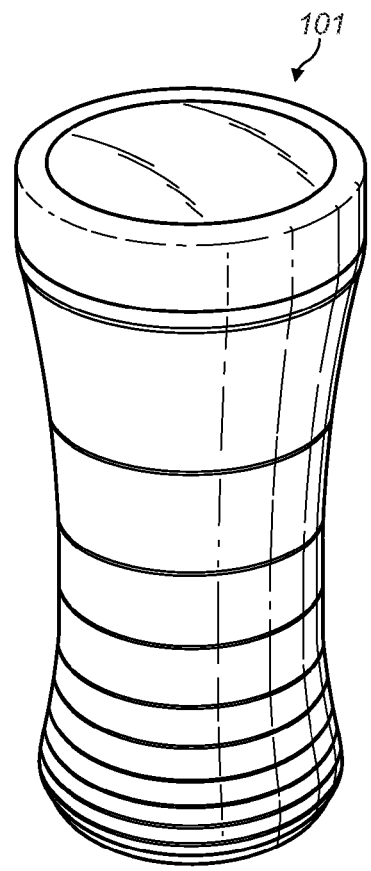
FIG. 9 shows a first example of container.
Figure 10:
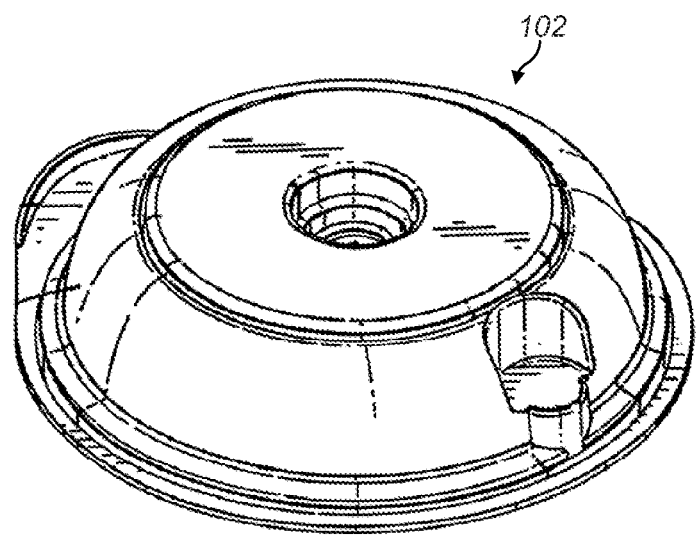
FIG. 10 shows a second example of container.
Figure 11:
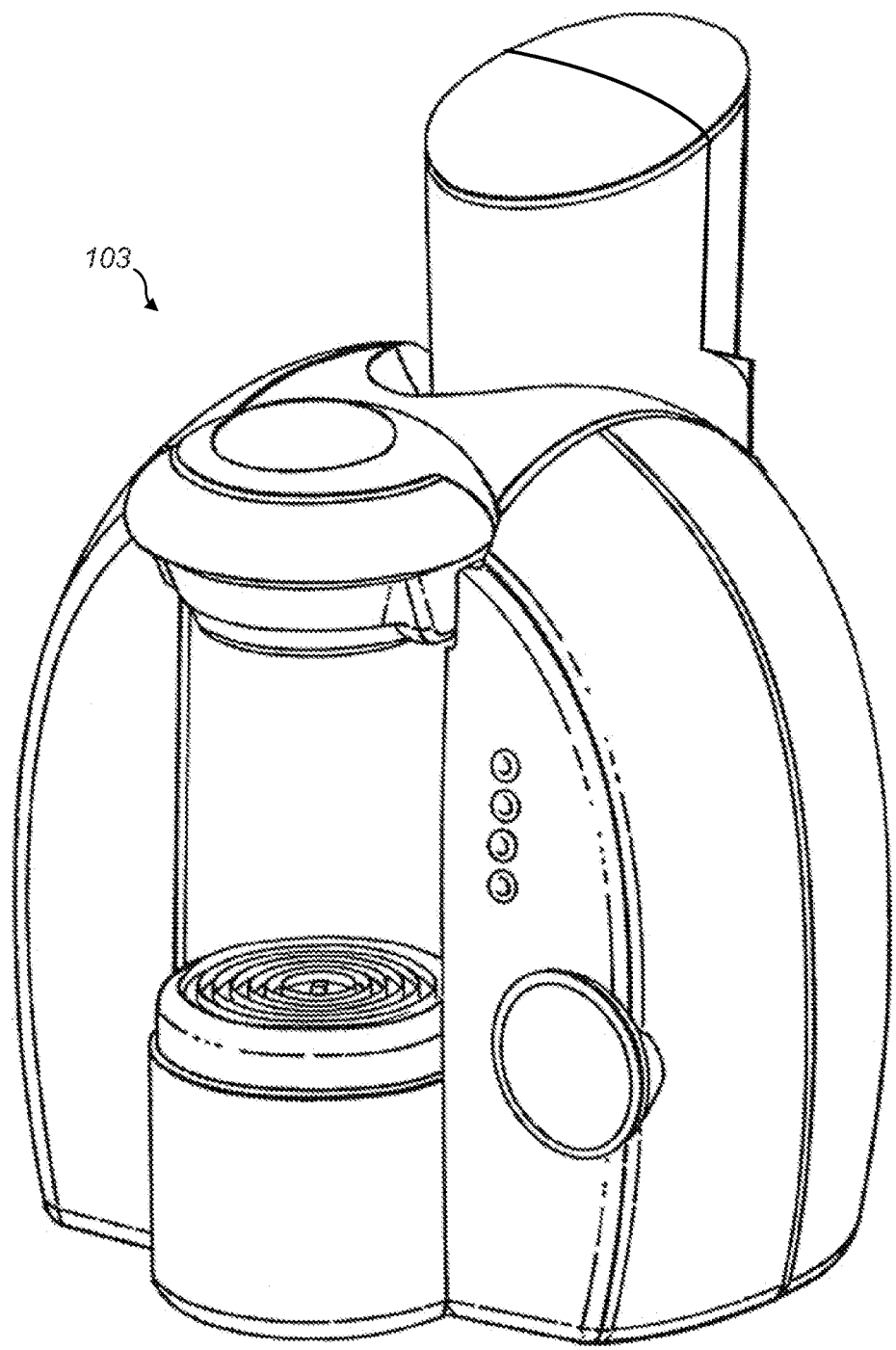
FIG. 11 shows an example of a beverage preparation machine.

The milled and blended coffee product described above or the soluble coffee product described above or the freeze-dried soluble coffee product described above may be packaged for sale in a container such as a jar 101 as shown in FIG. 9. Alternatively, the milled and blended coffee product or the soluble coffee product or the freeze-dried soluble coffee product may be packaged in a container suitable for use in a beverage preparation machine. For example, FIG. 10 shows a suitable container in the form of a cartridge 102 that may be used in a beverage preparation machine 103 as shown in FIG. 11.

The product may contain one or more additional beverage components such as natural or artificial sweeteners, dairy or non-dairy based creamers, lactose, vegetable fat, whey proteins, emulsifiers, stabilisers, modified starches, carriers, fillers, flavours, colours, nutrients, preservatives, flow agents or foaming agents.

The invention claimed is:

1. A coffee milling process comprising the steps of:
   a) introducing particles of a roasted coffee precursor into a milling chamber;
   b) introducing particles of soluble coffee into the milling chamber;
   c) jetting a gas into the milling chamber to mobilize the particles of the roasted coffee precursor and the particles of the soluble coffee; and
   d) producing a milled and blended coffee product by comminuting the particles of the roasted coffee precursor by self-collision of the particles of the roasted coffee precursor and by collision of the particles of soluble coffee with the particles of the roasted coffee precursor within the milling chamber, wherein the comminution results in the milled and blended coffee product having a dry Helos particle size distribution D90 of less than or equal to 40 micron.

2. The coffee milling process as claimed in claim 1 wherein the particles of the roasted coffee precursor and the particles of the soluble coffee are mixed together before introduction into the milling chamber.

3. The coffee milling process as claimed in claim 1 wherein the particles of the roasted coffee precursor and the particles of the soluble coffee are introduced separately into the milling chamber.

4. The coffee milling process as claimed in claim 1 wherein the particles of the roasted coffee precursor in step a) are at a temperature of between 5 and 30 degrees Celsius.

5. The coffee milling process as claimed in claim 1 wherein the milling chamber is not subject to cryogenic cooling during the steps b), c) and d).

6. The coffee milling process as claimed in claim 1 wherein the milled and blended coffee product produced in step d) comprises 10 to 80% by dry weight roasted ground coffee and 20 to 90% by dry weight soluble coffee.

7. The coffee milling process as claimed in claim 1 wherein the milled and blended coffee product produced in step d) comprises 10 to 70% by dry weight roasted ground coffee and 30 to 90% by dry weight soluble coffee.

8. The coffee milling process as claimed in claim 7 wherein the milled and blended coffee product produced in step d) comprises 15 to 50% by dry weight roasted ground coffee and 50 to 85% by dry weight soluble coffee.

9. The coffee milling process as claimed in claim 8 wherein the milled and blended coffee product produced in step d) comprises 50% by dry weight roasted ground coffee and 50% by dry weight soluble coffee.

10. The coffee milling process as claimed in claim 1 wherein in step d) the comminution results in the milled and blended coffee product having a dry Helos particle size distribution D90 of less than or equal to 30 microns.

11. The coffee milling process as claimed in claim 1 wherein the particles of roasted coffee precursor are whole roasted coffee beans.

12. The coffee milling process as claimed in claim 1 wherein the particles of roasted coffee precursor are coarsely-ground roasted coffee beans.

13. The coffee milling process as claimed in claim 1 wherein the particles of soluble coffee are particles of spray-dried instant coffee, particles of freeze-dried instant coffee, or a mixture thereof.

14. The coffee milling process as claimed in claim 1 wherein the gas jetted into the milling chamber in step b) is nitrogen, air, or a mixture thereof.

15. The coffee milling process as claimed in claim 14 wherein the gas is at a temperature between −20 degrees Celsius and ambient temperature.

16. The coffee milling process as claimed in claim 15, wherein the gas is at a temperature between −20 degrees Celsius and +5 degrees Celsius.

17. The coffee milling process as claimed in claim 1 wherein the producing a milled and blended coffee product further comprises jet-milling the particles of the roasted coffee precursor together with the particles of the soluble coffee within the milling chamber to comminute the particles of the roasted coffee precursor with the particles of the soluble coffee.

18. A coffee milling process comprising the steps of:
   a) introducing particles of a roasted coffee precursor into a milling chamber;
   b) introducing particles of soluble coffee into the milling chamber;
   c) jetting a gas into the milling chamber to mobilize the particles of the roasted coffee precursor and the particles of the soluble coffee;
   d) producing a milled and blended coffee product by comminuting the particles of the roasted coffee precursor by self-collision of the particles of the roasted coffee precursor and by collision of the particles of soluble coffee with the particles of the roasted coffee precursor within the milling chamber; and
   jet-milling the particles of the roasted coffee precursor together with the particles of the soluble coffee within the milling chamber to comminute the particles of the roasted coffee precursor with the particles of the soluble coffee;
   wherein prior to the jet-milling, the roasted coffee precursor has an average particle size of greater than 100 microns and the particles of the soluble coffee have a particle size of between about 100 and about 3500 microns.

19. The coffee milling process as claimed in claim 1 further comprising adding the milled and blended coffee product having a dry Helos particle size distribution D90 of less than or equal to 40 microns to a liquid to form a drinkable coffee beverage.

* * * * *